United States Patent [19]

Hayashi et al.

[11] Patent Number: 4,564,647

[45] Date of Patent: Jan. 14, 1986

[54] PROCESS FOR THE PRODUCTION OF POLYETHYLENE COMPOSITIONS

[75] Inventors: Hiroshi Hayashi; Koichi Matono; Satoshi Asahi, all of Sodegaura; Michitake Uoi, Ichihara, all of Japan

[73] Assignee: Idemitsu Kosan Company Limited, Tokyo, Japan

[21] Appl. No.: 669,760

[22] Filed: Nov. 8, 1984

[30] Foreign Application Priority Data

| Nov. 14, 1983 | [JP] | Japan | 58-212399 |
|---|---|---|---|
| Nov. 15, 1983 | [JP] | Japan | 58-213337 |
| May 14, 1984 | [JP] | Japan | 59-94690 |
| May 28, 1984 | [JP] | Japan | 59-106544 |
| May 30, 1984 | [JP] | Japan | 59-108289 |
| Jun. 4, 1984 | [JP] | Japan | 59-113031 |

[51] Int. Cl.[4] ............ C08K 3/04; C08K 9/02; C08F 2/44; C08F 10/02
[52] U.S. Cl. ............... 523/211; 523/200; 523/202; 523/204; 523/215; 523/216; 524/855; 526/129; 526/160
[58] Field of Search .......... 526/160, 129; 523/200, 523/202, 211, 215, 216, 204; 524/855

[56] References Cited

U.S. PATENT DOCUMENTS

| 2,917,501 | 12/1959 | Drucker et al. | 526/160 |
|---|---|---|---|
| 2,924,593 | 2/1960 | Breslow | 526/160 |
| 3,161,629 | 12/1964 | Gorsich | 526/160 |
| 3,950,303 | 4/1976 | Lipscomb | 524/855 |
| 3,971,767 | 7/1976 | Setterquist | 526/160 |
| 4,241,112 | 12/1980 | Kostandov et al. | 523/205 |
| 4,404,344 | 9/1983 | Sinn et al. | 526/336 |
| 4,473,672 | 9/1984 | Bottrill | 523/217 |

FOREIGN PATENT DOCUMENTS

| 0035242 | 9/1981 | European Pat. Off. | 526/160 |
|---|---|---|---|
| 0069951 | 1/1983 | European Pat. Off. | 526/160 |
| 2608933 | 9/1977 | Fed. Rep. of Germany | 526/160 |
| 423021 | 2/1967 | Japan | 526/160 |
| 910814 | 11/1962 | United Kingdom | 526/160 |
| 1480530 | 7/1977 | United Kingdom | 524/855 |

Primary Examiner—Herbert J. Lilling
Attorney, Agent, or Firm—Frishauf, Holtz, Goodman & Woodward

[57] ABSTRACT

A process for producing a polyethylene composition which comprises polymerizing ethylene in the presence of a catalyst comprising (A) a contact treatment product of (a) a high activity catalyst component and (b) a filler, and (B) an organoaluminum compound.

This process has no need for a deashing step, i.e., a step to remove the catalyst after polymerization, since the catalyst has a remarkably high activity.

In the polyethylene composition produced, the filler is dispersed uniformly and the separation of the filler from the polyethylene is scarcely observed.

26 Claims, No Drawings

PROCESS FOR THE PRODUCTION OF POLYETHYLENE COMPOSITIONS

BACKGROUND OF THE INVENTION

The present invention relates to a process for the production of polyethylene compositions. More particularly, it is concerned with a process for efficiently producing polyethylene compositions with filler uniformly dispersed therein by the use, as a catalyst component, of a product resulting from contact treatment of a specific high activity catalyst component with the filler.

Polyethylene is widely used because of its superior properties. In order to improve the properties of polyethylene more so that it can find other new uses, various fillers have been compounded. This compounding is usually carried out by mechanically kneading filler and polyethylene to thereby produce the desired resin composition. This mechanical kneading, however, have various disadvantages. For example, a large amount of kneading energy is needed in uniformly dispersing the filler in the resin, and the filler and resin are deteriorated during the process of kneading. Difficulties are encountered in compounding a large amount of the filler, or in compounding the filler to high molecular weight resins. Since dust is formed during the process, the operation enviroment becomes worse. Moreover, when a filler of high hardness is kneaded, a kneader is seriously worn out.

A compounding technique is also known in which filler is compounded during polymerization of ethylene. In accordance with this method, better dispersion can be attained than that by the above mechanical kneading method. The method, however, suffers from disadvantages in that some more kneading is needed to ensure uniform dispersion and the separation of the filler from the ultimate composition is liable to occur. A process for polymerizing ethylene is also known in which filler treated with the polymerization catalyst comprising an alkyl-aluminum compound and a transition metal compound is employed (see Japanese Patent Publication Nos. 10088/1962 and 11539/1962, and U.S. Pat. No. 3,950,303). The catalyst employed in the above process has, however, low activity. Therefore, in order to reduce halogen compounds contained in the polyethylene composition produced, it is necessary to carry out a deashing step, i.e., a step for removing the catalyst used, or to employ a catalyst containing no halogen compounds.

Accordingly, the process has disadvantages that the preparation of the catalyst and the post-treatment of the polyethylene composition are very complicated. In particular, these disadvantages become serious when the molecular weight of the polyethylene to be produced is lowered by introducing hydrogen gas in order to enhance the fluidity of the polyethylene. This is because the activity of the catalyst is extremely lowered by introducing hydrogen gas.

SUMMARY OF THE INVENTION

An object of the present invention is to provide a process for the production of polyethylene compositions in which filler is dispersed uniformly irrespective of the amount of the filler added and the separation of the filler does not occur.

Another object of the present invention is to provide a process for the production of the above polyethylene compositions with high efficiency and without the use of a large amount of energy.

Still another object of the present invention is to provide a process for the production of the above polyethylene compositions in a good operation enviroment.

A further object of the present invention is to provide a process for the production of the above polyethylene compositions without the wear of a kneader even if the filler compounded has a high hardness.

The present invention, in one embodiment, relates to a process for producing a polyethylene composition which comprises polymerizing ethylene or copolymerizing ethylene and a small amount of other α-olefins in the presence of a catalyst comprising:

(A) a product resulting from contact treatment of
  (a) a high activity catalyst component containing a transition metal and soluble in a hydrocarbon solvent, and
  (b) a filler; and
(B) an organoaluminum compound.

In another embodiment, the present invention relates to a process for producing a polyethylene composition which comprises polymerizing ethylene or copolymerizing ethylene and a small amount of other α-olefins in the presence of a catalyst comprising Components (A) and (B) as defined above, and also in the presence of:

(C) a filler having an affinity, equal to or higher than that of the filler (b), for polyethylene.

DETAILED DESCRIPTION OF THE INVENTION

The process of the present invention is, as described above, carried out in the presence of (A) a product resulting from contact treatment of (a) a high activity catalyst component containing a transition metal which component is soluble in a hydrocarbon solvent, and (b) a filler, and (B) an organoaluminum compound.

The high activity catalyst component (a) containing a transition metal which component is soluble in a hydrocarbon solvent can be prepared by various procedures. For example, when the transition metal is titanium, the component (a) can be prepared by reacting higher fatty acid salts, higher alcohol salts or long chain aliphatic hydrocarbon group-containing phosphoric acid salts of magnesium or manganese (hereinafter referred to merely as "magnesium or manganese salts") with titanium compounds represented by the general formula (1):

$$TiX_n(OR)_{4-n} \tag{1}$$

wherein R is an alkyl or acyl group having from 1 to 10 carbon atoms, X is a halogen atom, and n is a real number of from 0 to 4. The amount of the titanium compounds added is not critical. The molar ratio of the titanium compounds to the magnesium or manganese salts is usually 0.5:1 or less and preferably from 0.02:1 to 0.2:1. If the molar ratio is in excess of 0.5:1, catalytic activity undesirably drops seriously.

Higher fatty acids and higher alcohols may be saturated or unsaturated and contain at least 10 carbon atoms and preferably at least 16 carbon atoms. Representative examples of higher fatty acids include capric acid, lauric acid, myristic acid, palmitic acid, stearic acid, and oleic acid. Representative examples of higher alcohols include decanol, lauryl alcohol, myristyl alcohol, cetyl alcohol, and stearyl alcohol. Phosphoric acids may be phosphorous acids; long chain aliphatic hydrocarbon group-containing phosphoric acids include mono- or di-alkyl esters of phosphoric acid or phosphorous acid, such as $ROPH_2O_3$, $(RO)_2PHO_2$, $ROPH_2O_2$, $RPH_2O_3$, $R_2PHO_2$, and $RPH_2O_2$, wherein R is an alkyl group. Long chain aliphatic hydrocarbon groups are aliphatic hydrocarbon groups, saturated or unsaturated, having at least 6 carbon atoms and preferably at least 8 carbon atoms. Representative examples of such groups include a hexyl group, a heptyl group, an octyl group, a 2-ethyl-hexyl group, a nonyl group, a decyl group, a lauryl group, a myristyl group, a heptadecyl group, a stearyl group, and an octadecyl group.

These magnesium or manganese salts can be prepared by various procedures. Commercially available magnesium or manganese salts may be used as such or after drying. Magnesium salts, for example, can be prepared by reacting alkyl magnesium with higher fatty acids, higher alcohols or long chain aliphatic hydrocarbon group-containing phosphoric acids. The magnesium or manganese salts may combine together with other metals to form complex salts.

Representative examples of the titanium compounds of the general formula (1) include titanium tetrahalides such as $TiCl_4$, $TiBr_4$ and $TiI_4$, monoalkoxytitanium trihalides such as $Ti(OCH_3)Cl_3$, $Ti(OC_2H_5)Cl_3$, $Ti(O.i-C_3H_7)Cl_3$, $Ti(OC_4H_9)Cl_3$, and $Ti(OC_2H_5)Br_3$, dialkoxytitanium dihalides such as $Ti(OCH_3)_2Cl_2$, $Ti(OC_2H_5)_2Cl_2$, $Ti(O.i-C_3H_7)_2Cl_2$, $Ti(OC_4H_9)_2Cl_2$, and $Ti(OC_2H_5)_2Br_2$, trialkoxy monohalides such as $Ti(OCH_3)_3Cl$, $Ti(OC_2H_5)_3Cl$, $Ti(O.i-C_3H_7)_3Cl$, $Ti(OC_4H_9)_3Cl$, and $Ti(OC_2Hlhd 5)_3Br$, tetraalkoxytitaniums such as $Ti(OCH_3)_4$, $Ti(OC_2H_5)_4$, $Ti(O.i-C_3H_7)_4$, and $Ti(OC_4H_9)_4$, and further, titanates such as $Ti(OCOCH_3)_4$ and $Ti(OCOCH_3)_2Cl_2$.

In preparing the component (a), the reaction of the magnesium or manganese salts and the titanium compounds of the general formula (1), for example, can be carried out under various conditions. Usually they are mixed in hydrocarbon solvents and reacted at a temperature from 50° C. to the boiling point of the solvent for at least 10 minutes. In some cases, a procedure can be employed in which the magnesium or manganese salts and the component (b), filler, are first mixed in hydrocarbon solvents and, thereafter, the titanium compounds of the general formula (1) are added and reacted. If vanadium compounds such as $VCl_4$, $VOCl_3$, $VO(OC_2H_5)_3$, and $VO(OC_4H_9)_3$ are used in combination with the above-described magnesium or manganese salts and titanium compounds in preparing the component (a) containing titanium as the transition metal, there can be produced polymers having a broad distribution of molecular weight and copolymerization can be carried out with improved efficiency.

As the component (a), as well as the above-described compounds, cyclopentadienyl compounds represented by the following general formula (2) can be used.

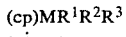
$(cp)MR^1R^2R^3$         (2)

(wherein cp represents a cyclopentadienyl group, M represents titanium, vanadium, zirconium, or hafnium, and $R^1$, $R^2$ and $R^3$ are each an alkyl group having from 1 to 6 carbon atoms, a cyclopentadienyl group, a halogen atom, or a hydrogen atom). In particular, cyclopentadienyl compounds represented by the general formula (3):

$(cp)_2MR^1R^2$         (3)

(wherein cp, M, $R^1$, and $R^2$ are the same as defined above) can be used.

Cyclopentadienyl compounds containing zirconium as the transition metal include cyclopentadienylzirconium compounds and compounds prepared by reacting cyclopentadienylzirconium compounds with aluminoxane as prepared by known procedures. Examples of such cyclopentadienylzirconium compounds include dichlorodicyclopentadienylzirconium, and dimethyldicyclopentadienylzirconium. In reacting these cyclopentadienylzirconium compounds with aluminoxane, it is preferred that they be mixed in aromatic hydrocarbon solvents such as benzene, toluene, xylene, and other alkylbenzenes. In this case, aliphatic hydrocarbons and alicyclic hydrocarbons are not preferred since they can dissolve therein the above zirconium compounds and the aluminoxane only insufficiently. The above reaction is preferably carried out before mixing with the component (b), but can be carried out simultaneously with mixing with the component (b).

The aluminoxane can be prepared by reacting trialkylaluminums such as trimethylaluminum and triethylaluminum, or dialkylaluminum monohalides such as dimethylaluminum chloride and diethylaluminum chloride with water.

Cyclopentadienyl compounds containing titanium as the transition metal are cyclopentadienyltitanium compounds or products resulting from the reaction of cyclopentadienyltitanium compounds and aluminoxane. Examples of such cyclopentadienyltitanium compounds include dicyclopentadienyltitanium dichloride and dimethyldicyclopentadienyltitanium.

Cyclopentadienyl compounds containing vanadium as the transition metal include dicyclopentadienylvanadium dichloride.

Cyclopentadienyl compounds containing hafnium as the transition metal include dicyclopentadienylhafnium dichloride and dimethyldicyclopentadienylhafnium.

The thus-prepared component (a) is soluble in one or more of hydrocarbon solvents such as aliphatic hydrocarbons, alicyclic hydrocarbons, and aromatic hydrocarbons. It is preferred for the component (a) to have such high activity that in low pressure-polymerization of ethylene in the presence of the component (a) and the component (B), organoaluminum compound, at least 10 kilograms of polyethylene can be formed per 1 gram of the transition metal atom per unit ethylene partial pressure. That is, it is preferred for the component (a) to have such high activity that in polymerization of ethylene at an ethylene partial pressure of from atmospheric pressure to 50 atmospheric pressure in the presence of 1 gram (calculated as the transition metal atom) of the component (a), at least 10 kilograms of polyethylene can be formed per unit ethylene partial pressure. If the activity of the component (a) is low, it is inevitably necessary to add it in larger amounts. This is not preferred since a deashing step, i.e., a step to remove the catalyst used, is needed after the step of polymerization; the post-treatment becomes very complicated.

The component (A) of the catalyst of the present invention is a product resulting from contact treatment of the components (a) and (b). The component (b) is a filler; the particular is not critical in the present invention and, as the component (b), various fillers can be used. The filler of the component (b) is determined appropriately depending on the purpose for which the ultimate polyethylene composition is used, for example. Representative examples of such fillers include metals, metal oxides, metal carbonates, carbonaceous substances, various ceramics, and organic pigments. In addition, solid foaming agents can be used. The metals include aluminum, nickel, iron, and tin. The metal oxides include alumina, titania, zirconia, silica, iron oxide, and also silica-alumina, mica, and ferrite. The metal carbonates include calcium carbonate and barium carbonate. The carbonaceous substances include carbon black (e.g., furnace black and Ketjen black), graphite, active carbon, and carbon fibers. Representative examples of ceramics include carbides such as silicon carbide (SiC), chromium carbide ($Cr_3C_2$), titanium carbide (TiC), zirconium carbide (ZrC), boron carbide ($B_4C$), and diamong (C), nitrides such as silicon nitrides (SiN, $Si_3N$, $Si_2N_3$, and $Si_3N_4$), boron nitride (BN), zirconium nitride (ZrN), niobium nitride (NbN), and titanium nitride (TiN), borides such as titanium boride (TiB), zirconium boride (ZrB), tantalum boride (TaB), vanadium boride ($VB_2$), and lanthanum boride ($LaB_6$), and silicides such as titanium silicide (TiSi), tantalum silicide (TaSi), molybdenum silicide (MoSi), and tungsten silicide ($WSi_2$). The type of the filler to be used can be determined appropriately depending on the purpose for which the ultimate polyethylene composition is used. When the polyethylene composition is used as an abrasion-resistant material or heat-releasing material, for example, silicon carbides are used. When it is used as an insulating material, boron nitrides and silicon nitrides are used, and when it is used as a neutron-blocking material, boron nitrides, for example, are used.

These fillers, e.g., metals, metal oxides, metal carbonates, carbonaceous substances, ceramics, glass fibers, glass beads, glass baloons, mica, potassium titanate, and pulp, can be used without application of any treatment. In addition, fillers which have been subjected to metal-plating or have been coated with metals or metal oxides can be used. Metals which can be used in the plating or coating treatment include nickel, silver, copper, aluminum, iron, and tin. Metal oxides which can be used in the coating treatment include titanium oxide, tin oxide, silica, alumina, ferrite, and silica alumina.

The plating or coating treatment can be carried out by techniques such as electrolysis and dipping. In the coating treatment, in particular, the metals or metal oxides are sufficient to be attached to the surface of the filler by kneading, for example.

In addition, as the filler of the component (b), organic pigments can be used. Any organic pigments can be used as long as they are insoluble in hydrocarbon solvents. The type of the organic pigment is determined appropriately depending on the desired color in which the ultimate polyethylene composition is colored. Representative examples of such organic pigments include water-insoluble azo-, water-soluble azo-, phthalocyanine-, anthraquinone-, thioindigoid-, perillene-, dioxazine-, and quinacridone-based ones.

In addition, as the filler of the component (b), solid foaming agents can be used. Any solid foaming agents can be used as long as they are insoluble in hydrocarbon solvents such as aliphatic hydrocarbons, alicyclic hydrocarbons, and aromatic hydrocarbons. Representative examples of such solid foaming agents include azo compounds such as azodicarbonamide and azobisisobutyronitrile, nitroso compounds such as dinitrosopentamethylenetetramide, and sulfonylhydrazide compounds such as p-toluenesulfonylhydrazide and p,p'-oxybis-(benzenesulfonylhydrazide).

The filler of the component (b) may take various forms, such as powder, granule, flake, foil, fiber, and whisker. In each form, it is preferred that the maximum length be less than 5 millimeters, with the maximum length of less than 2 millimeters being more preferred. If fillers having a maximum length of more than 5 millimeters are used, flocculation occurs vigorously during the polymerization of ethylene, resulting in the formation of clumps. In some cases, these clumps cause blocking of pipes, for example, and provide a polyethylene composition which is not uniform in quality.

Prior to the contact treatment with the component (a), it is preferred for the component (b) to be sufficiently dried by techniques such as heating under reduced pressure and azeotropic drying using solvents, or preliminarily treated with organoaluminum compounds such as trialkylaluminum, dialkylaluminum monohalide, and monoalkylaluminum dihalide, since such treatment prevents water in the filler or its reactive functional groups from exerting adverse influences on the component (a).

The contact treatment of the components (a) and (b) can be carried out by various procedures. For example, the filler of the component (b) is added, as such or in the form of a suspension, to a hydrocarbon solution of the component (a), and they are thoroughly mixed and then aged for a predetermined period of time. Conversely, a procedure may be employed in which the filler of the component (b) is added to a hydrocarbon solvent to prepare a suspension, a hydrocarbon solution of the component (a) is added to the suspension, and they are thoroughly mixed and then aged for a predetermined period of time. As solvents or media for use in the contact treatment of the components (a) and (b), suitable ones can be chosen from aliphatic hydrocarbons, alicyclic hydrocarbons, aromatic hydrocarbons, etc. The temperature at which the contract treatment is carried out can be determined appropriately within the range of from room temperature to the boiling point of the solvent or medium used. The aging time is usually about 1 hour or more at room temperature. As the temperature is higher, the aging time is more shortened.

The blending ratio of the component (a) to the component (b) in the contact treatment varies depending on various factors and cannot be determined unconditionally. In brief, it suffices that the component (a) is added in such an amount that the polymerization or copolymerization of ethylene proceeds efficiently and, furthermore, a deashing step is not needed after the step of polymerization or copolymerization of ethylene, and that the component (b) is added in such an amount that the filler content of the ultimate polyethylene composition is at least 0.5% by weight. In accordance with a typical procedure, the proportion of the filler of the component (b) in the polyethylene composition is first determined and then the component (a) is added in such an amount as to permit the production of the polyethylene without the need of the deashing step. In this case, the catalytic activity of the component (a) is necessary to determine in advance. This procedure will hereinafter be explained in detail.

Assuming that the component (a) has such a catalytic activity as to permit the production of A kilograms of polyethylene per gram of the transition metal atom contained therein, the amount of the component (b) (filler) used is B kilograms, the proportion of the component (b) in the ultimate polyethylene composition is C percent, and the amount of the transition metal atom in the component (a) as needed in this case is X grams, the amount of the polymer formed (P kilograms) is represented by P=AX The ratio of the amount of the polymer formed to the amount of the filler is represented as follows:

P:B= 100 −C:C

Based on the above equations, the following can be obtained.

$$X = \frac{B(100 - C)}{A \cdot C} \text{ (grams)}$$

If the filler content is increased, or the molecular weight of the polyethylene to be produced is controlled by adding hydrogen, there is a danger that the catalytic activity of the component (a) would drop under the influence of the filler or the hydrogen. For this reason, it is preferred that the component (a) be added in an amount somewhat greater than that calculated from the above equation.

The product resulting from the contact treatment of the components (a) and (b) is used as the component (A) of the catalyst of the present invention. The component (A) may be introduced in the reaction system in a slurry form, or after the separation of the solvent or medium. If the product of the component (A) is previously treated with organoaluminum compounds, its catalytic activity is increased. This treatment is such that the organoaluminum compound is added to the component (A) in such a manner that the ratio of the organoaluminum compound to the transition metal atom contained in the component (a) is 20:1 or less, at a temperature of 50° C. or less, and then they are mixed for about 1 to 5 hours. Various organoaluminum compounds can be used for this purpose, including dialkylaluminum halides such as dimethylaluminum monochloride, diethylaluminum monochloride, and diisobutylaluminum monochloride, alkylaluminum dihalides such as ethylaluminum dichloride and isobutylaluminum dichloride, alkylaluminum sesquihalides such as ethylaluminum sesquichloride, and their mixtures.

The component (B) of the catalyst of the present invention is an organoaluminum compound. Various organoaluminum compounds can be used for this purpose. Usually organoaluminum compounds represented by the general formula:

R′$_m$AlX′$_{3-m}$ are used. In this formula, R′ is an alkyl group having from 1 to 10 carbon atoms, preferably from 1 to 6 carbon atoms, a cycloalkyl group, or an aryl group, X′ is a halogen atom, and m is a positive real number of 3 or less, specifically 1, 1.5, 2 or 3. Representative examples of these organoaluminum compounds are trialkylaluminum compounds such as trimethylaluminum, triethylaluminum, triisopropylaluminum, triisobutylaluminum, and trioctylaluminum dialkylaluminum monohalides such as diethylaluminum monochloride, diethylaluminum monobromide, diethylaluminum monoidide, diisopropylaluminum monochloride, diisobutylaluminum monochloride, and dioctylaluminum monochloride, alkylaluminum sesquihalides such as methylaluminum sesquichloride, ethylaluminum sesquichloride, ethylaluminum sesquibromide, and butylaluminum sesquichloride, and their mixtures. In particular, mixtures of trialkyl-luminum compounds and dialkylaluminum halides, and mixtures of alkylaluminum dihalides and alkylaluminum sesquihalides are preferably used when the component (a) of the component (A) contains titanium as the transition metal. In addition, organolithiumaluminum compounds and alkyl group-containing aluminoxane resulting from the reaction of trialkylaluminum compounds and water can be used. In particular, these aluminoxanes are preferably used when as the component (a) cyclopentadienyltitanium compounds or cyclopentadienylzirconium compounds as described above are used.

The process of the present invention is carried out in the presence of a catalyst comprising the above components (A) and (B). The ratio of the component (A) to the component (B) is not critical and can be determined appropriately. They are usually compounded so that the aluminum atom of the component (B) is from 2 to 2,000 moles, preferably from 10 to 1,000 moles per mole of the titanium or zirconium atom of the component (A).

In another embodiment of the present invention, the process of the present invention can be carried out in the presence of, as well as the catalyst comprising the components (A) and (B), a filler as Component (C). The filler of the component (C) may be the same as or different from that of the component (b). Usually different fillers are used. In particular, as the component (C), fillers having an affinity for polyethylene, equal to or higher than that of the filler of the component (b) are used. Representative examples of fillers which can be used as the component (C) include metals, metal oxides, metal carbonates, and carboneceous substances. Taking into consideration the type of the filler of the component (b), the filler of the component (C) is determined; i.e., a filler exhibiting a higher affinity for polyethylene than that of the component (b) is chosen from the above-described fillers, for example.

In determining which of two fillers does exhibit a higher affinity for polyethylene, ethylene is actually polymerized in the presence of the two fillers and it is examined which does readily separate from the polyethylene. A filler readily separating from the polyethylene can be used as the filler of the component (b), and the other, as the filler of the component (C). For example, when, as fillers, copper and carbon black are used, since copper separates from the polyethylene more readily than carbon black, copper is used as the filler of the component (b), and carbon black, as the filler of the component (C).

The filler of the component (C) is not limited in shape and size as in the filler of the component (b); i.e., fillers having various shapes and sizes can be used as the fillers of the component (C). It is preferred for the filler of the component (C) to have a maximum length of 5 millimeters or less. It is particularly preferred that the filler of the component (C) be smaller in grain diameter than that of the component (b). The amount of the component (C) added is no subject to any special limitation and can be determined appropriately according to the equation $$X = \frac{B(100 - C)}{A \cdot C} \text{ (grams)}$$

(wherein A and C are the same as defined above, and B is the total amount of the components (b) and (C) (kilograms)).

In accordance with the process of the present invention, ethylene is polymerized, or ethylene is copolymerized with small amounts of other α-olefins in the presence of the components (A) and (B), or in the presence of the components (A), (B) and (C). These other α-olefins include propylene, butene-1, hexene-1, octene-1, 4-methylpentene-1, decene, and octadecene. The maximum proportion of the other α-olefins is about 20 percents based on the total amount of ethylene and the olefins.

The process of polymerization and polymerization conditions can vary over wide ranges; for example, the polymerization or copolymerization can be carried out by suitable techniques such as slurry polymerization and gas-phase polymerization, or continuous polymerization and batch-wise polymerization.

The amount of the component (A) added is determined according to the above-described equation. It is determined so that the proportion of the filler of the component (b) in the ultimate polyethylene composition is at least 0.5 percent by weight, preferably from about 1.0 to 90 percents by weight.

The ethylene pressure in the reaction system is from atmospheric pressure to 50 kilograms per square centimeter, and the reaction temperature is from 20° to 100° C. and preferably from 50° to 90° C. The molecular weight can be controlled by known techniques such as by adding hydrogen.

In the case of slurry polymerization, for example, the reaction mixture is freed of, e.g., the solvent by application of techniques such as flash and centrifugal separation followed by drying, whereupon the desired polyethylene composition can be obtained.

The process of the present invention produces various advantages. Some of the major advantages are shown below.

A polyethylene composition in which a filler is dispersed uniformly irrespective of the amount of the filler added can be easily produced in a powdery or fibrous form without the need of a large amount of kneading energy. In the produced polyethylene composition, the separation of the filler does not occur because of good adhesion between the polyethylene and the filler. The molecular weight of the polyethylene can be readily controlled, and a high molecular polyethylene with the filler dispersed therein can be easily produced. That is, since, in accordance with the process of the present invention, ethylene is polymerized or copolymerized in the presence of the high activity catalyst component (a) deposited on or attached to the filler of the component (b), polyethylene is formed on the surface of the filler and, as a result, the adhesion between the polyethylene and the filler is increased and the polyethylene composition can be produced in which the filler is well dispersed. It is sufficient that the amount of the catalyst used can be very small, and thus it is not necessary to apply a deashing treatment and a high quality polyethylene composition can be obtained. Furthermore, even when fillers of high hardness, such as ceramics, are used, a kneader is less worn out in kneading the composition since the surface of the filler is covered with the formed polyethylene.

The polyethylene composition produced by the process of the present invention can find numerous uses. When copper, aluminum or carbon black, for example, is used as the filler, the resulting polyethylene composition can be used in preparation of electrically conductive materials or electromagnetic shielding materials. When ferrite, for example, is used, the polyethylene composition can be used in preparation of damper. When carbon black, iron, iron oxide, titanium white, or organic pigments, for example, are used, the polyethylene composition can be used as a master batch for coloring. When ceramics are used as the filler, the polyethylene composition can be used in preparation of abrasion resistant materials, heat conductive materials, electrical insulation materials, or neutron blocking materials. Moreover, when foaming agents are used as the filler, the polyethylene composition can be used as a foaming resin or a master batch, for example. In addition, the polyethylene composition produced by the process of the present invention can be used in preparation of antistatic materials or coating materials, for example. The present invention is described in greater detail with reference to the following examples.

EXAMPLE 1

(1) Preparation of Titanium-Containing Catalyst Component

In a 500-milliliter flask the atmosphere of which had been replaced with argon were placed at room temperature 100 milliliters of dehydrated n-heptane, 10.0 grams (17 millimoles) of magnesium stearate, and 0.33 gram (1.7 millimoles) of titanium tetrachloride, which were then heated and reacted under reflux for 2 hours to prepare a viscous solution of the titanium-containing catalyst component.

(2) Evaluation of Activity of the Titanium-Containing Catalyst Component

In a 1-liter autoclave the atmosphere of which had been replaced with argon were placed 400 milliliters of dehydrated n-hexane, 1 millimole of triethylaluminum, 1 millimole of diethylaluminum chloride, and 0.005 millimole (calculated as titanium) of the titanium-containing catalyst component as prepared in (1) above, which were then heated to 80° C. Subsequently, hydrogen was supplied to increase the pressure to 4.0 kilograms per square centimeter (by gauge) and, thereafter, ethylene was continuously supplied so that the total pressure was maintained at 9 kilograms per square centimeter (by gauge) and polymerized for 1 hour. The amount of the thus-produced polyethylene was 58 grams and its polymerization activity was 242 kilograms per gram of titanium per hour.

(3) Contact Treatment of the Titanium-Containing Catalyst Component and Filler

In a 500-milliliter flask the atmosphere of which had been replaced with argon were placed 100 milliliters of dehydrated n-hexane at room temperature and then 20 grams of powdered copper which had been vacuum dried at 200° C. for 3 hours. Subsequently, 0.005 millimole (calculated as titanium) of the titanium-containing catalyst component as prepared in (1) above was added, and the resulting mixture was heated and refluxed for 1 hour to achieve the contact treatment, thereby producing a contact treatment product (a mixed slurry of the catalyst component and the filler).

(4) Polymerization of Ethylene

All the contact treatment product as prepared in (3) above was placed in a 1-liter autoclave the atmosphere of which had been replaced with argon, and 300 milliliters of dehydrated n-hexane was then added to make the total amount to 400 milliliters. Subsequently, 1 millimole of triethylaluminum, and 1 millimole of diethylaluminum monochloride were added, and the resulting mixture was heated to 80° C. Then, hydrogen was supplied until the pressure reached 4 kilograms per square centimeter (by gauge), and ethylene was continuously supplied while maintaining the total pressure at 9 kilograms per square centimeter (by gauge) and polymerized for 30 minutes to yield 39 grams of a copper-containing polyethylene composition. The dried and powdered polyethylene composition was light beige, and the separation of the powdered copper was not observed.

Conditions and the results of the polymerization are shown in Table 1.

COMPARATIVE EXAMPLE 1

In this example, the contact treatment of the present invention was not applied.

Twenty grams of the same powdered copper as used in the preparation of the contact treatment product in (3) of Example 1 was placed in a 1-liter autoclave the atmosphere of which had been replaced with argon. Subsequently, 400 milliliters of dried n-hexane, 1 millimole of triethylaluminum, 1 millimole of diethylaluminum monochloride, and 0.005 millimole (calculated as titanium) of the same titanium-containing catalyst solution as prepared in (1) of Example 1 were added, and the resulting mixture was heated to 80° C. Then, hydrogen was supplied until the hydrogen partial pressure reached 4 kilograms per square centimeter (by gauge), and ethylene was continuously supplied while maintaining the total pressure at 9 kilograms per square centimeter (by gauge) and polymerized for 20 minutes. The amount of the polyethylene composition produced was 41 grams, and the powdered composition was light beige. Clearly, however, the separation of the powdered copper from the polyethylene was observed.

EXAMPLES 2 TO 5

The procedure of Example 1 was repeated wherein the type and amount of the filler, the type of the organoaluminum compound, and the amount of the catalyst component were changed as shown in Table 1. The results are shown in Table 1.

EXAMPLE 6

(1) Preparation of Titanium-Containing Catalyst Component

In a 200-milliliter flask the atmosphere of which had been replaced with argon were placed 50 milliliters of n-heptane and 5.4 grams (20 millimoles) of commercially available stearyl alcohol at room temperature, and then 10 millimoles of ethylbutylmagnesium was added dropwise over 20 minutes. They were heated and reacted under reflux for 3 hours. Then the reaction mixture was cooled to 40° C. and 1 millimole of titanium tetrachloride was added. The mixture was then again heated and reacted under reflux for 3 hours to prepare a transparent solution.

(2) Evaluation of Activity of the Titanium-Containing Catalyst Component

Ethylene was polymerized in the presence of 0.01 millimole of the catalyst component as prepared in (1) above in the same manner as in (2) of Example 1, whereupon 61.3 grams of polyethylene was produced. The activity of the catalyst was 126 kilograms per gram of titanium per hour.

(3) Contact Treatment of the Titanium-Containing Catalyst Component and Filler In the same manner as in (3) of Example 1, 9.6 grams of powdered aluminum and 0.02 millimole of the titanium-containing catalyst component were contact-treated to prepare a contact treatment product.

(4) Polymerization of Ethylene

Ethylene was polymerized in the same manner as in (4) of Example 1 to produce an aluminum-containing polyethylene composition. The results are shown in Table 1.

EXAMPLE 7

An aluminum-containing polyethylene composition was produced in the same manner as in Example 6 wherein the amounts of the powdered aluminum and titanium-containing catalyst component were changed to 15.7 grams and 0.01 millimole, respectively. The results are shown in Table 1.

EXAMPLES 8 AND 9

The procedure of Example 1 was repeated wherein the type and amount of the filler, the amount of the titanium or zirconium-containing catalyst component, and the molar ratio of the catalyst component to the organoaluminum compound were changed as shown in Table 1. The results are shown in Table 1.

EXAMPLE 10

(1) Preparation of Aluminoxane

In a 500-milliliter flask the atmosphere of which had been replaced with argon were placed 100 milliliters of dehydrated toluene and 71 millimoles of commercially available copper sulfate pentahydrate ($CuSO_4 \cdot 5H_2O$) at room temperature, and a solution of 246 millimoles of trimethylaluminum in toluene (2 moles per liter) was added dropwise at 20° C. over 30 minutes. They were reacted at room temperature for 24 hours and then filtered. The filtrate was freed of toluene under reduced pressure to yield 4.2 grams of a colorless solid material (molecular weight as determined by the cryoscopic method using benzene: 763). Again toluene was added to the solid material to prepare a 2 moles per liter (calculated as aluminum) solution of aluminoxane.

(2) Evaluation of Activity of Zirconium-Containing Catalyst Component

In a 1-liter autoclave the atmosphere of which had been replaced with argon were placed 400 milliliters of dehydrated toluene, 6 millimoles (calculated as aluminum) of the aluminoxane as prepared in (1) above, and 0.003 millimole of dicyclopentadienylzirconium dichloride, which were then heated to 50° C. Ethylene was continuously introduced while maintaining the total pressure at 8 kilograms per square centimeter (by gauge) and polymerized for 5 minutes, whereupon 16.4 grams of polyethylene was produced. The activity of the catalyst was 719 kilograms per gram of zirconium per hour.

(3) Contact Treatment of the Zirconium-Containing Catalyst Component and Filler

In a 500-milliliter flask the atmosphere of which had been replaced with argon were placed 100 milliliters of dehydrated toluene and 10.3 grams of dried ferric oxide ($Fe_2O_3$), and then, as a catalyst component, 0.005 millimole of dicyclopentadienylzirconium dichloride was added. They were contact-treated at room temperature for 1 hour to produce a contact treatment product.

(4) Polymerization of Ethylene

In a 1-liter autoclave the atmosphere of which had been replaced with argon was placed all the contact treatment product as prepared in (3) above, and then dehydrated n-hexane was added to make the total amount to 400 milliliters. As the organoaluminum compound, 10 millimoles of the aluminoxane as prepared in (1) above was added. Thereafter, in the same manner as in (4) of Example 1, ethylene was polymerized. The results are shown in Table 1.

EXAMPLE 11

The procedure of Example 1 was repeated wherein the type and amount of the filler, and the amount of the catalyst component were changed as shown in Table 1. The results are shown in Table 1.

EXAMPLE 12

(1) Preparation of Aluminoxane

An aluminoxane solution was prepared in the same manner as in (1) of Example 10 except that the trimethylaluminum was replaced by 246 millimoles of dimethylaluminum monochloride.

(2) Evaluation of Activity of Zirconium-Containing Catalyst Component

Ethylene was polymerized in the same manner as in (2) of Example 10 except that the aluminoxane was replaced by a mixture of 3.6 millimoles of the aluminoxane and 3.6 millimoles of triethylaluminum. As a result, 23 grams of polyethylene was produced, and the activity of the catalyst was 1,010 kilograms per gram of zirconium per hour.

(3) Contact Treatment of the Zirconium-Containing Catalyst Component and Filler

A contact treatment product was prepared in the same manner as in (3) of Example 10 except that triiron tetraoxide ($Fe_3O_4$) was used as a filler in place of the ferric oxide, and a mixture of 0.005 millimole of dicyclopentadienylzirconium dichloride and 6 millimoles of the aluminoxane as prepared in (1) above was used in place of the dicyclopentadienylzirconium dichloride.

(4) Polymerization of Ethylene

Ethylene was polymerized in the same manner as in (4) of Example 10 except that as the contact treatment product the above-prepared one was used and, as the catalyst component, 6 millimoles of triethylaluminum was used. The results are shown in Table 1.

EXAMPLE 13

(1) Preparation of Aluminoxane

Aluminoxane was prepared in the same manner as in (1) of Example 10.

(2) Evaluation of Activity of Titanium-Containing Catalyst Component

Ethylene was polymerized in the same manner as in (2) of Example 10 except that 4 millimoles of the aluminoxane as prepared in (1) above and 0.002 millimole of dicyclopentadienyltitanium dichloride were used, and the polymerization time was changed to 1 hour. As a result, 39.5 grams of polyethylene was produced, and the activity of the catalyst was 412 kilograms per gram of titanium per hour.

(3) Contact Treatment of the Titanium-Containing Catalyst Component and Filler

A contact treatment product was prepared in the same manner as in (3) of Example 10 except that triiron tetraoxide ($Fe_3O_4$) was used as a filler in place of the ferric oxide, and 0.005 millimoles of dicyclopentadienyltitanium dichloride was used as the catalyst component.

(4) Polymerization of Ethylene

Ethylene was polymerized in the same manner as in (4) of Example 10 except that as the contact treatment product the above-prepared one was used and, as the organoaluminum compound, 6.7 millimoles of the aluminoxane as prepared in (1) above was used. The results are shown in Table 1.

EXAMPLES 14 TO 16

The procedure of Example 1 was repeated wherein the type and amount of the filler, the molar ratio of the catalyst component to the organoaluminum compound, and the amount of the catalyst component were changed as in Example 1. The polymerization conditions and the results are shown in Table 1.

EXAMPLE 17

(1) Preparation of Titanium-Containing Catalyst Component

In a 200-milliliter flask the atmosphere of which had been replaced with argon were placed 40 milliliters of dehydrated n-heptane, 4 grams (6.5 millimoles) of manganese oleate, and 0.12 gram (0.65 millimole) of titanium tetrachloride, which were then heated and reacted under reflux for 3 hours to prepare a titanium-containing catalyst component.

(2) Evaluation of Activity of the Titanium-Containing Catalyst Component

Ethylene was polymerized in the same manner as in (2) of Example 1 except that 0.02 millimole (calculated as titanium) of the titanium-containing catalyst component as prepared in (1) above was used. The activity of the catalyst was 28 kilograms per gram of titanium per hour.

(3) Contact Treatment of the Titanium-Containing Catalyst and Filler

In a 500-milliliter flask equipped with a stirrer, the atmosphere of which had been replaced with argon were placed 100 milliliters of dehydrated n-heptane, 3.6 grams of carbon black (Ketjen Black EC, produced by Lion Co., Ltd.) vacuum dried at 200° C. for 8 hours, and 0.08 millimole (calculated as titanium) of the titanium-containing catalyst component as prepared in (1) above, which were then reacted under reflux for 3 hours to produce a contact treatment product.

(4) Polymerization of Ethylene

In a 1-liter autoclave were placed 300 milliliters of dehydrated n-heptane, 2.0 millimoles of triethylaluminum, and 2.0 millimoles of diethylaluminum monochloride, and the whole amount of the contact treatment product as prepared in (3) above was added thereto. The resulting mixture was heated to 80° C., and hydrogen was supplied so that its partial pressure reached 4 kilograms per square centimeter (by gauge). Then, ethylene was continuously introduced while maintaining the total pressure at 9 kilograms per square centimeter (by gauge) and polymerized for 30 minutes. The polymerization conditions and the results are shown in Table 1.

EXAMPLES 18 TO 22

The procedure of Example 1 was repeated wherein the type and amount of the filler, the molar ratio of the titanium or zirconium-containing catalyst component to the organoaluminum compound, and the amount of the catalyst component were changed as shown in Table 1. The polymerization conditions and the results are shown in Table 1.

EXAMPLE 23

(1) Contact Treatment of Titanium-Containing Catalyst Component and Filler

In a 500-milliliter flask the atmosphere of which had been replaced with argon were placed 150 milliliters of dehydrated n-hexane and 10.0 grams of aluminum foils (1.4 millimeters by 1 millimeter by 0.025 millimeter, produced by Transmet Co. at room temperature, and then 2 millimoles of diethylaluminum monochloride was added dropwise while stirring. They were reacted at 40° C. for 1 hour. Subsequently, 0.02 millimole (calculated as titanium) of the titanium-containing catalyst component as prepared in (1) of Example 1 was added and contact-treated at 40° C. for 2 hours to prepare a contact treatment product.

(2) Polymerization of Ethylene

In a 1-liter flask the atmosphere of which had been replaced with argon was placed 150 milliliters of the contact treatment product as prepared in (1) above, and then 250 milliliters of dehydrated n-hexane was added to make the total amount to 400 milliliters. Subsequently, 2 millimoles of triethylaluminum and 2 millimoles of diethylaluminum chloride were added, and the resulting mixture was heated to 80° C. Then, hydrogen was introduced until its partial pressure reached 4 kilograms per sqaure centimeter (by gauge), and ethylene was introduced continuously while maintaining the total pressure at 9 kilograms per sqaure centimeter (by gauge) and polymerized for 2.5 minutes to produce 25 grams of an aluminum-containing polyethylene. In the dried and powdered polyethylene composition, the aluminum foils were covered with the polyethylene and the separation of the aluminum foils from the polyethylene was scarcely observed in the composition.

COMPARATIVE EXAMPLE 2

In this example, the contact treatment of the component (a) and the component (b) was not applied.

Twenty-two grams of the same aluminum foils as used in the preparation of the contact treatment product in (1) of Example 23 was placed in a 1-liter autoclave the atmosphere of which had been replaced with argon. Subsequently, 400 milliliters of dried n-hexane, 1 millimole of triethylaluminum, 1 millimole of diethylaluminum monochloride, and 0.01 millimole (calculated as titanium) of the same titaniumcontaining catalyst as prepared in (1) of Example 1 were added, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 9 minutes.

The amount of the polyethylene composition produced was 51.5 grams. The separation of the aluminum foils from the polyethylene was clearly observed in the composition.

EXAMPLE 24

(1) Preparation of Titanium-Containing Catalyst Component

A transparent solution was prepared in the same manner as in (1) of Example 6 except that 20 millimoles of di-2- ethylhexyl phosphate was used in place of stearyl alcohol.

(2) Evaluation of Activity of Titanium-Containing Catalyst Component

Ethylene was polymerized in the same manner as in (2) of Example 1 except that 0.005 millimole (calculated as titanium) of the titanium-containing catalyst component as prepared in (1) above and 2 millimoles of diethylaluminum monochloride were used. The amount of polyethylene produced was 42 grams. The activity of the catalyst was 175 kilograms per gram of titanium per hour.

(3) Contact Treatment of the Titanium-Containing Catalyst Component and Filler A contact treatment product was prepared in the same manner as in (3) of Example 1 except that barium carbonate as filler and 0.01 millimole (calculated as titanium) of the titanium-containing catalyst component as prepared in (1) above were used.

(4) Polymerization of Ethylene

Ethylene was polymerized in the same manner as in (4) of Example 1 except that the contact treatment product prepared in (3) above and 2 millimoles of diethylaluminum monochloride were used. The results are shown in Table 1.

TABLE 1

| | Filler | | Amount of Catalyst calculated as Titanium or Zirconium (millimole) | TEA*2/ DEAC*3 (millimole) | Time of Polymerization (min.) | Polyethylene Composition | | |
|---|---|---|---|---|---|---|---|---|
| | Type | Amount (gram) | | | | Yield (gram) | Weight of Polyethylene (gram) | Content of Filler (weight %) |
| Example 1 | Copper Powder (10μ) | 20 | 0.005 | 1/1 | 30 | 39 | 19 | 51 |
| Example 2 | " | 10 | 0.01 | 1/1 | 5.0 | 24 | 14 | 42 |
| Example 3 | " | 30 | 0.01 | 1/1 | 30 | 48 | 18 | 62 |
| Example 4 | " | 30 | 0.02 | 2/2 | 2.5 | 51 | 21 | 59 |
| Example 5 | " | 60 | 0.01 | 1/1 | 2.0 | 68 | 8 | 88 |
| Example 6 | Aluminum Powder (80μ) | 9.6 | 0.02 | 1/1 | 15 | 31 | 21.4 | 31 |
| Example 7 | " | 15.7 | 0.01 | 1/1 | 30 | 24.5 | 8.8 | 64 |
| Example 8 | Alumina (20μ) | 11.7 | 0.02 | 2/2 | 60 | 24.2 | 12.5 | 48 |
| Example 9 | Silica (10μ) | 10 | 0.01 | 1/1 | 30 | 33 | 23 | 30 |
| Example 10 | Ferric Oxide ($Fe_2O_3$) (10μ) | 10.3 | 0.005 | Aluminoxane 10.0 | 10 | 34.3 | 24 | 30 |
| Example 11 | Triiron Tetraoxide ($Fe_3O_4$) (80μ) | 11.6 | 0.01 | 1/1 | 10 | 24.5 | 12.9 | 47 |
| Example 12 | " | 41.2 | 0.005 | 6/0 | 10 | 61 | 19.8 | 68 |
| Example 13 | " | 62 | 0.005 | Aluminoxane 6.7 | 10 | 71.5 | 9.5 | 87 |
| Example 14 | Aluminum Fiber (2 mm × 60μ) | 10 | 0.01 | 1/1 | 30 | 30 | 20 | 33 |
| Example 15 | Aluminum Fiber (5 mm × 60μ) | 5 | 0.01 | 1/1 | 30 | 26 | 21 | 19 |
| Example 16 | Carbon Fiber (5 mm × 10μ) | 10.5 | 0.02 | 2/2 | 60 | 32.7 | 22.2 | 32 |
| Example 17 | Carbon Black | 3.6 | 0.08 | 2/2 | 30 | 40 | 36.4 | 9 |
| Example 18 | Alumina*1 (20μ) | 15.2 | 0.02 | 2/2 | 60 | 50 | 34.8 | 30 |
| Example 19 | Silica*1 (10μ) | 15.5 | 0.01 | 1/1 | 20 | 45.5 | 30 | 34 |
| Example 20 | Carbon Fiber*1 (5 mm × 10μ) | 11 | 0.02 | 2/2 | 30 | 35.5 | 24.5 | 31 |
| Example 21 | Carbon Fiber (5 mm × 10μ) | 30 | 0.01 | 1/1 | 35 | 52 | 22 | 58 |
| Example 22 | " | 17.3 | 0.01 | 1/1 | 30 | 43.1 | 25.8 | 40 |
| Example 23 | Aluminum Foil*1 | 10 | 0.02 | 2/2 | 2.5 | 25 | 15 | 40 |
| Example 24 | Barium Carbonate Powder (60μ) | 10.3 | 0.01 | 0/2 | 30 | 28.5 | 18.2 | 36 |

*1Treated with 2 millimoles (1 millimole in Examples 19 and 20) of diethylaluminum chloride.
*2Triethylaluminum
*3Diethylaluminum chloride

EXAMPLE 25

(1) Contact Treatment of the Titanium-Containing Catalyst Component and Filler

In a 500-milliliter flask the atmosphere of which had been replaced with argon were placed 150 milliliters of dehydrated n-hexane and 40 grams of powdered copper (average diameter: 10μ) at room temperature, and then 2 millimoles of diethylaluminum monochloride was added dropwise while stirring. They were reacted at 40° C. for 1 hour. Subsequently, 0.02 millimole (calculated as titanium) of the titanium-containing catalyst component as prepared in (1) of Example 1 was added thereto and contact treated at 40° C. for 2 hours to prepare a contact treatment product.

(2) Polymerization of Ethylene

In a 1-liter autoclave the atmosphere of which had been replaced with argon was placed 250 milliliters of dehydrated n-hexane slurry containing 40 grams of triiron tetraoxide ($Fe_3O_4$) (average diameter: 80μ) vacuum dried at 200° C., and then 2 millimoles of triethylaluminum, 2 millimoles of diethylaluminum monochloride and the whole amount of the contact treatment product prepared in (1) above were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 5 minutes.

The amount of the polyethylene composition produced was 100 grams. The content of the powdered copper was 40% by weight and the content of the triiror tetraoxide was 40% by weight in the composition. The separation of either the powdered copper or the triiron tetraoxide from the polyethylene was scarcely observed in the composition.

EXAMPLE 26

Ethylene was polymerized in the same manner as in Example 25 except that the amount of the powdered copper was 40 grams in (1) of Example 25, and that 10.3 grams of carbon black (Ketjen) (average diameter: 30 mμ) in place of triiron tetraoxide was used and the amount of the titaniumcontaining catalyst component was 0.02 millimole (calculated as titanium) in (2) of Example 25. The amount of the polyethylene composition produced was 66.7 grams. The content of the powdered copper was 60% by weight and the content of the carbon black was 15% by weight in the composition.

EXAMPLE 27

(1) Preparation of Titanium-Containing Catalyst Component

In a 200-milliliter flask the atmosphere of which had been replaced with argon were placed 50 milliliters of dehydrated n-heptane, 5.64 grams (10 millimoles) of magnesium stearyl alkoxide and 0.19 gram (1 millimole) of titanium tetrachloride at room temperature. And then, the resulting mixture was heated and was reacted for 3 hours under reflux to prepare a transparent viscous solution of titanium-containing catalyst component.

(2) Evaluation of Activity of Titanium-Containing Catalyst Component

In a 1-liter autoclave the atmosphere of which had been replaced with argon were placed 400 milliliters of dehydrated n-hexane, 2 millimoles of triethylaluminum, 2 millimoles of diethylaluminum monochloride and 0.01 millimole (calculated as titanium) of the titanium-containing catalyst component as prepared in (1) above, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 1 hour.

The amount of polyethylene produced was 60 grams. The activity of the catalyst was 126 kilograms per gram of titanium per hour.

(3) Contact Treatment of the Titanium-Containing Catalyst Component and Filler In a 500-milliliter flask the atmosphere of which had been replaced with argon were placed 150 milliliters of dehydrated n-hexane and 9.6 grams of aluminum foil (thickness: 0.025 mm, length: 1.4×1 mm) at room temperature, and then 4 millimoles of diethylaluminum monochloride was added dropwise while stirring. They were reacted at 40° C. for 1 hour. Subsequently, 0.02 millimole (calculated as titanium) of the titanium-containing catalyst component as prepared in (1) above was added thereto and contact-treated at 40° C. for 2 hours to prepare a contact treatment product.

(4) Polymerization of Ethylene

In a 1-liter autoclave the atmosphere of which had been replaced with argon was placed 250 milliliters of dehydrated n-hexane slurry containing 10.5 grams of carbon black (Ketjen) (average diameter: 30 m$\mu$), and then 2 millimoles of triethylaluminum, 2 millimoles of diethylaluminum monochloride and 0.02 millimole (calculated as titanium) of the contact treatment product prepared in (3) above were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 12 minutes.

The amount of the polyethylene composition produced was 42.5 grams. The content of the aluminum foil was 23% by weight and the content of the carbon black was 25% by weight in the composition.

EXAMPLE 28

(1) Contact Treatment of the Zirconium-Containing Catalyst Component and Filler In a 500-milliliter flask the atmosphere of which had been replaced with argon were placed 150 milliliters of dehydrated toluene and 10 grams of aluminum fiber (average diameter: 60$\mu$, length: 3 mm) at room temperature, and then 4 millimoles of diethylaluminum monochloride was added dropwise while stirring. They were reacted at 40° C. for 1 hour. Subsequently, 0.005 millimole (calculated as zirconium) of dicyclopentadienyl zirconium dichloride prepared in (2) of Example 10 was added thereto and contact treated at 20° C. for 1 hour to prepare a contact treatment product.

(2) Polymerization of Ethylene

In a 1-liter autoclave the atmosphere of which had been replaced with argon was placed 250 milliliters of dehydrated toluene slurry containing 30 grams of copper powder (average diameter: 10$\mu$), and 10 millimoles of aluminoxane prepared in (1) of Example 10 and the whole amount of the contact treatment product prepared in (1) above were added thereto, and the resulting mixture was heated to 50° C. Then, ethylene was continuously supplied while maintaining the total pressure at 5 kilograms per square centimeter (by gauge) and polymerized for 10 minutes.

The amount of the polyethylene composition produced was 50.6 grams. The content of the aluminum fiber was 20% by weight and the content of the copper powder was 59% by weight in the composition.

EXAMPLE 29

(1) Evaluation of Activity of Titanium-Containing Catalyst Component

In a 1-liter autoclave the atmosphere of which had been replaced with argon were placed 400 milliliters of dehydrated toluene, 3 millimoles of aluminoxane prepared in (1) of Example 10, 3 millimoles of triethylaluminium and 2×10$^{-3}$ millimole (calculated as titanium) of bis (cyclopentadienyl) titanium dichloride, and the resulting mixture was heated to 50° C. Then, ethylene was continuously supplied while maintaining the total pressure at 8 kilograms per square centimeter (by gauge) and polymerized for half an hour.

The amount of polyethylene produced was 25 grams. The activity of the catalyst was 500 kilograms per gram of titanium per hour.

(2) Contact Treatment of the Titanium-Containing Catalyst Component and Filler In a 500-milliliter flask the atmosphere of which had been replaced with argon were placed 150 milliliters of dehydrated toluene and 10 grams of carbon black (Diablack G) (average diameter: 80 m$\mu$) at room temperature, and then 7.5 millimoles of aluminoxane and 0.005 millimole (calculated as titanium) of bis (cyclopentadienyl) titanium dichloride were added thereto and contact treated at 20° C. for 1 hour to prepare a contact treatment product.

(3) Polymerization of Ethylene

In a 1-liter autoclave the atmosphere of which had been replaced with argon was placed 250 milliliters of dehydrated toluene slurry containing 10.6 grams of carbon black (Diablack G) (average diameter: 30 m$\mu$), and then 7.5 millimoles of triethylaluminum and the whole amount of the contact treatment product prepared in (2) above were added thereto, and the resulting mixture was heated to 50° C. Then ethylene was continuously supplied while maintaining the total pressure at 5 kilograms per square centimeter (by gauge) and polymerized for 10 minutes.

The amount of the polyethylene composition produced was 33 grams. The content of the carbon black having 80 m$\mu$ of average diameter was 30% by weight and the content of the carbon black having 30 m$\mu$ average diameter was 32% by weight in the composition.

EXAMPLE 30

(1) Preparation of Titanium-Containing Catalyst Component

In a 500-milliliter flask the atmosphere of which had been replaced with argon were placed 150 milliliters of dehydrated n-heptane, 10.0 grams (16.2 millimoles) of manganese oleate and 0.31 gram (1.62 millimoles) of titanium tetrachloride at room temperature.

And then, the resulting mixture was heated and was reacted for 2 hours under reflux to prepare a light brown viscous solution of titanium-containing catalyst component.

(2) Evaluation of Activity of Titanium-Containing Catalyst Component

In a 1-liter autoclave the atmosphere of which had been replaced with argon were placed 400 milliliters of dehydrated n-hexane, 2 millimoles of triethylaluminum, 2 millimoles of diethylaluminum monochloride and 0.02 millimole (calculated as titanium) of the titanium-containing catalyst component as prepared in (1) above, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 1 hour.

The amount of polyethylene produced was 26.9 grams. The activity of the catalyst was 28 kilograms per gram of titanium per hour.

(3) Contact Treatment of the Titanium-Containing Catalyst Component and Filler

In a 500-milliliter flask the atmosphere of which had been replaced with argon were placed 150 milliliters of dehydrated n-hexane and 9.5 grams of aluminum powder (average diameter: 80μ) at room temperature, and then 4 millimoles of diethylaluminum monochloride was added dropwise while stirring. They were reacted at 40° C. for 1 hour.

Subsequently, 0.02 millimole (calculated as titanium) of the titanium-containing catalyst component as prepared in (1) above was added thereto and contact-treated at 40° C. for 2 hours to prepare a contact treatment product.

(4) Polymerization of Ethylene

In a 1-liter autoclave the atmosphere of which had been replaced with argon was placed 250 milliliters of dehydrated n-hexane slurry containing 9.9 grams of carbon black (Ketjen) (average diameter: 30 mμ), and then 2 millimoles of triethylaluminum, 2 millimoles of diethylaluminum monochloride and 0.04 millimole (calculated as titanium) of the contact treatment product prepared in (3) above were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 40 minutes.

The amount of the polyethylene composition produced was 41.6 grams. The content of the aluminum powder was 23% by weight and the content of the carbon black was 24% by weight in the composition.

EXAMPLE 31

(1) Preparation of Titanium-Containing Catalyst Component

A transparent solution of titanium-containing catalyst component was prepared in the same manner as in (1) of Example 27 except that 10 millimoles of magnesium salt of di-2-ethylhexyl phosphate was used in place of magnesium stearyl alkoxide.

(2) Evaluation of Activity of Titanium-Containing Catalyst Component

Ethylene was polymerized in the same manner as in (2) of Example 27 except that 0.01 millimole (calculated as titanium) of the titanium-containing catalyst component as prepared in (1) above was used, and that the polymerization period of time was 1 hour. The amount of polyethylene produced was 65 grams. The activity of the catalyst was 136 kilograms per gram of titanium per hour.

(3) Contact Treatment of the Titanium-Containing Catalyst Component and Filler

A contact treatment product was prepared in the same manner as in (1) of Example 25 except that the amount of powdered copper was 20 grams, and that 0.02 millimole (calculated as titanium) of the titanium-containing catalyst component as prepared in (1) above was used.

(4) Polymerization of Ethylene

Ethylene was polymerized in the same manner as in (2) of Example 25 exept that 20 grams of powdered aluminum (average diameter: 40μ) as filler and the contact treatment product prepared in (3) above were used, and that the polymerization period of time was 20 minutes.

The amount of the polyethylene composition produced was 67 grams. The content of the powdered copper was 30% by weight and the content of the powdered aluminum was 30% by weight in the composition. The separation of either the powdered copper or the powdered aluminum from the polyethylene ethylene was scarcely observed in the composition.

COMPARATIVE EXAMPLE 3

(1) Contact Treatment of the Titanium-Containing Catalyst Component and Filler

In a 500-milliliter flask the atmosphere of which had been replaced with argon were placed 200 milliliters of dehydrated n-hexane, 29.4 grams of powdered copper (average diameter: 10μ) and 10 grams of carbon black (Ketjen) (average diameter: 30mμ) at room temperature, and then 4 millimoles of diethylaluminum monochloride was added dropwise while stirring. They were reacted at 40° C. for 1 hour. Subsequently, 0.02 millimole (calculated as titanium) of the titanium-containing catalyst component prepared in (1) of Example 1 was added thereto and contact treated at 40° C. for 2 hours to prepare a contact treatment product.

(2) Polymerization of Ethylene

In a 1-liter autoclave the atmosphere of which had been replaced with argon was placed 200 milliliters of dehydrated n-hexane, and then 2 millimoles of triethylaluminum, 2 millimoles of diethylaluminum monochloride and the whole amount of the contact treatment product prepared in (1) above were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 10 minutes.

The amount of the polyethylene composition produced was 62 grams. The separation of the powdered copper from the polyethylene was observed in the composition.

COMPARATIVE EXAMPLE 4

Ethylene was polymerized in the same manner as in (2) of Example 25 except that 10 grams of carbon black (Ketjen) (average diameter: 30 m$\mu$) as filler in (1) of Example 25 and 30 grams of powdered copper (average diameter: 10$\mu$) as filler in (2) of Example 25 were used, and that the polymerization period of time was 10 minutes.

The amount of the polyethylene composition produced was 64 grams. The separation of the powdered copper from the polyethylene was observed in the composition.

EXAMPLE 32

(1) Contact Treatment of the Titanium-Containing Catalyst Component and Filler In a 500-milliliter flask the atmosphere of which had been replaced with argon were placed 100 milliliters of dehydrated n-hexane and 40 grams of mica flake plated with nickel which had been vacuum dried at room temperature (20° C.) for 3 hours. Subsequently, 0.01 millimole (calculated as titanium) of the titanium-containing catalyst component prepared in (1) of Example 1 was added thereto and heated. Then the resulting mixture was treated for 1 hour under reflux to prepare a contact treatment product.

(2) Polymerization of Ethylene

In a 1-liter autoclave the atmosphere of which had been replaced with argon were placed the whole amount of the contact treatment product prepared in (1) above and 300 milliliters of dehydrated n-hexane so that the amount of the resulting mixture was 400 milliliters. Then, 1 millimole of triethylaluminum and 1 millimole of diethylaluminum monochloride were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 18 minutes.

The amount of the polyethylene composition produced was 65 grams. The color of the composition was dark brown. The separation of the mica flake plated with nickel from the polyethylene was scarcely observed in the composition. The volume specific resistance of the composition at 20° C. was 0.6$\Omega$.cm. Therefore, the composition has electrically good conductivity. This is because the mica flakes plated with nickel are dispersed uniformly in the polyethylene. The conditions and results are shown in Table 2.

COMPARATIVE EXAMPLE 5

In a 1-liter autoclave the atmosphere of which had been replaced with argon was placed 400 milliliters of slurry containing 20 grams of the same mica flake plated with nickel as used in the preparation of the contact treatment product in (1) of Example 32. Subsequently, 1 millimole of triethylaluminum, 1 millimole of diethylaluminum monochloride, and 0.005 millimole (calculated as titanium) of the same titanium-containing catalyst as prepared in (1) of Example 1 were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition produced was 46 grams. The color of the composition was dark brown. The separation of the mica flake plated with nickel from the polyethylene was clearly observed in the composition.

EXAMPLES 33 TO 35

Ethylene was polymerized in the same manner as in Example 32 except that the type and amount of the filler, the catalyst component and the organoaluminum compound were changed as in Table 2. The results are shown Table 2.

EXAMPLE 36

(1) Preparation of Titanium-Containing Catalyst Component

In a 200-milliliter flask the atmosphere of which had been replaced with argon were placed 50 milliliters of n-heptane and 5.4 grams (20 millimoles) of commercially available stearyl alcohol at room temperature, and then 10 millimoles of ethylbutyl magnesium was added dropwise over 20 minutes. They were heated and reacted under reflux for 3 hours. Then the reaction mixture was cooled to 40° C. and 1 millimole of titanium tetrachloride was added thereto. The mixture was then heated again and reacted under reflux for 3 hours to prepare a transparent solution.

(2) Evaluation of Activity of Titanium-Containing Catalyst Component

Ethylene was polymerized in the same manner as in (2) of Example 1 except that 0.01 millimole (calculated as titanium) of the titanium-containing catalyst component as prepared in (1) above was used. The amount of polyethylene produced was 61.3 grams. The activity of the catalyst was 126 kilograms per gram of titanium per hour.

(3) Contact Treatment of the Titanium-Containing Catalyst Component and Filler A contact treatment product was prepared in the same manner as in (1) of Example 32 except that 20 grams of glass fiber covered with aluminum as filler and 0.01 millimole (calculated as titanium) of the titanium-containing catalyst component as prepared in (1) above were used.

(4) Polymerization of Ethylene

Ethylene was polymerized in the same manner as in (2) of Example 32 except that the contact treatment product prepared in (3) above was used. The polyethylene composition containing glass fiber covered with aluminum was produced. The results are shown in Table 2.

EXAMPLE 37

(1) Contact Treatment of the Titanium-Containing Catalyst Component and Filler In a 500-milliliter flask the atmosphere of which had been replaced with argon were placed 150 milliliters of dehydrated n-hexane and 40.5 grams of mica flake plated with nickel at room temperature, and then 1 millimole of diethylaluminum monochloride was added dropwise while stirring. They were reacted at 40° C. for 1 hour. Subsequently, 0.01 millimole (calculated as titanium) of the titanium-containing containing catalyst component as prepared in (1) of Example 1 was added thereto and contact-treated at 40° C. for 2 hours to prepare a contact treatment product.

(2) Polymerization of Ethylene

In a 1-liter autoclave the atmosphere of which had been replaced with argon were placed the whole amount of the contact treatment product prepared in (1) above and dehydrated n-hexane so that the amount of the resulting mixture was 400 milliliters. Then 1 millimole of triethylaluminum and 1 millimole of diethylaluminum monochloride were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 20 minutes.

The amount of the polyethylene composition produced was 76 grams. The mica flake plated with nickel was entirely covered with polyethylene in the composition. The separation of the mica flake plated with nickel from the polyethylene was scarcely observed in the composition.

EXAMPLE 38

(1) Preparation of Titanium-Containing Catalyst Component

A transparent solution was prepared in the same manner as in (1) of Example 36 except that 20 millimoles of di-2-ethylhexyl phosphate was used in place of stearyl alcohol.

(2) Evaluation of Activity of Titanium-Containing Catalyst Component

Ethylene was polymerized in the same manner as in (2) of Example 1 except that 0.005 millimole (calculated as titanium) of the titanium-containing catalyst component as prepared in (1) above and 2 millimoles of diethylaluminum monochloride were used. The amount of polyethylene produced was 42 grams. The activity of the catalyst was 175 kilograms per gram of titanium per hour.

(3) Contact Treatment of the Titanium-Containing Catalyst Component and Filler

A contact treatment product was prepared in the same manner as in (3) of Example 1 except that 8 grams of carbon fiber plated with nickel as filler and 0.01 millimole (calculated as titanium) of the titanium-containing catalyst component as prepared in (1) above were used.

(4) Polymerization of Ethylene

Ethylene was polymerized in the same manner as in (4) of Example 1 except that the contact treatment product prepared in (3) above and 2 millimoles of diethylaluminum monochloride were used. The results are shown in Table 2.

COMPARATIVE EXAMPLE 6

In a 1-liter autoclave the atmosphere of which had been replaced with argon was placed 8.5 grams of the same carbon fiber plated with nickel as used in the preparation of the contact treatment product in Example 38. Subsequently, 400 milliliters of dehydrated n-hexane, 1 millimole of diethylaluminum monochloride, and 0.01 millimole (calculated as titanium) of the same titanium-containing catalyst as prepared in (1) of Example 38 were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition produced was 45 grams. The separation of the carbon fiber plated with nickel from the polyethylene was clearly observed in the composition.

EXAMPLE 39

(1) Preparation of Aluminoxane

In a 500-milliliter flask the atmosphere of which had been replaced with argon were placed 100 milliliters of dehydrated toluene and 71 millimoles of commercially available copper sulfate pentahydrate ($CuSO_4 \cdot 5H_2O$) at room temperature, and a solution of 246 millimoles of trimethylaluminum in toluene (2 moles per liter) was added dropwise at 20° C. over 30 minutes. They were reacted at room temperature 24 hours and then filtered. The filtrate was freed of toluene under reduced pressure to yield 4.2 grams of a colorless solid material (molecular weight as determined by the cryoscopic method using benzene: 763). Again toluene was added to the solid material to prepare a 2 moles per liter (calculated as aluminum) solution of aluminoxane.

(2) Evaluation of Activity of Zirconium-Containing Catalyst Component

In a 1-liter autoclave the atmosphere of which had been replaced with argon were placed 400 milliliters of dehydrated toluene, 6 millimoles (calculated as aluminum) of the aluminoxane as prepared in (1) above, and 0.003 millimole of dicyclopentadienylzirconium dichloride, which were then heated to 50° C. Ethylene was continuously introduced while maintaining the total pressure at 8 kilograms per centimeter (by gauge) and polymerized for 5 minutes, whereupon 16.4 grams of polyethylene was produced. The activity of the catalyst was 719 kilograms per gram of zirconium per hour.

(3) Contact Treatment of the Zirconium-Containing Catalyst Component and Filler

In a 500-milliliter flask the atmosphere of which had been replaced with argon were placed 100 milliliters of dehydrated toluene and 8.2 grams of dried carbon fiber plated with nickel at room temperature, and then, as a catalyst component, 0.005 millimole of dicyclopentadienylzirconium dichloride was added thereto at room temperature. They were contact-treated at room temperature for 1 hour to produce a contact treatment product.

(4) Polymerization of Ethylene

In a 1-liter autoclave the atmosphere of which had been replaced with argon were placed the whole amount of the contact treatment product prepared in (3) above and dehydrated n-hexane so that the amount of the resulting mixture was 400 milliliters. Then 10 millimoles of (calculated as aluminum) aluminoxane as organoaluminum compound was added thereto. Thereafter, in the same manner as in (4) of Example 1, ethylene was polymerized. The results are shown in Table 2.

EXAMPLE 40

(1) Preparation of Aluminoxane

Aluminoxane was prepared in the same manner as in (1) of Example 39.

(2) Evaluation of Activity of Titanium-Containing Catalyst Component

Ethylene was polymerized in the same manner as in (2) of Example 36 except that 4 millimoles (calculated as aluminum) of aluminoxane prepared in (1) above and 0.002 millimole (calculated as titanium) of the dicyclopentadienyltitanium dichloride were used, and that the polymerization period of time was 1 hour. The amount of polyethylene produced was 39.5 grams. The activity of the catalyst was 412 kilograms per gram of titanium per hour.

(3) Contact Treatment of the Titanium-Containing Catalyst Component and Filler

A contact treatment product was prepared in the same manner as in (3) of Example 39 except that glass beads covered with aluminum as filler and 0.005 millimole (calculated as titanium) of the dicyclopentadienyltitanium dichloride as catalyst were used.

(4) Polymerization of Ethylene

Ethylene was polymerized in the same manner as in Example 39 except that the whole amount of the contact treatment product prepared in (3) above and 6.7 millimoles (calculated as aluminum) of aluminoxane prepared in (1) above were used. The results are shown in Table 2.

ture (20° C.) for 4 hours. Subsequently, 0.005 millimole (calculated as titanium) of the titanium-containing catalyst component prepared in (1) of Example 1 was added thereto and heated. Then the resulting mixture was contact-treated for 1 hour under reflux to prepare a contact treatment product.

(2) Polymerization of Ethylene

In a 1-liter autoclave the atmosphere of which had been replaced with argon were placed the whole amount of the contact treatment product prepared in (1) above and 300 milliliters of dehydrated n-hexane so that the amount of the resulting mixture was 400 milliliters. Then, 1 millimole of triethylaluminum and 1 millimole of diethylaluminum monochloride were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition produced was 38 grams. After drying, the composition was powder colored dark green uniformly. The resin colored uniformly was produced by coloring polyethylene with a master batch of the composition produced above. The results are shown in Table 3.

COMPARATIVE EXAMPLE 7

In a 1-liter autoclave the atmosphere of which had been replaced with argon was placed 400 milliliters of slurry containing 20 grams of the same phthalocyanine-green as used in the preparation of the contact treatment product in (1) of Example 41. Subsequently, 1 millimole of triethylaluminum, 1 millimole of diethylaluminum

TABLE 2

| | Filler | | Amount of Catalyst calculated as Titanium or Zirconium (millimole) | TEA*/ DEAC** (millimole) | Time of Polymerization (min.) | Polyethylene Composition | | |
|---|---|---|---|---|---|---|---|---|
| | Type | Amount (gram) | | | | Yield (gram) | Weight of Polyethylene (gram) | Content of Filler (weight %) |
| Example 32 | Mica flake plated with nickel (<60 mesh) | 40 | 0.01 | 1/1 | 20 | 65 | 25 | 62 |
| Example 33 | Mica flake plated with nickel (<60 mesh) | 8.3 | 0.005 | 1/1 | 30 | 35.5 | 27.2 | 23 |
| Example 34 | Mica flake covered with titanium oxide (1.5μ × 0.1μ) | 30 | 0.005 | 1/1 | 30 | 55.8 | 25.8 | 54 |
| Example 35 | Glass beads covered with silver (30μ) | 50 | 0.005 | 1/1 | 25 | 68 | 18 | 73 |
| Example 36 | Glass fiber covered with silver | 20 | 0.01 | 1/1 | 45 | 52.5 | 32.5 | 38 |
| Example 37 | Mica flake plated with nickel (<60 mesh) | 40.5 | 0.01 | 1/1 | 20 | 76 | 35.5 | 53 |
| Example 38 | Carbon fiber plated with nickel (7μ × 3 mm) | 8 | 0.01 | 0/2 | 30 | 40 | 32 | 20 |
| Example 39 | Carbon fiber plated with nickel (7μ × 3 mm) | 8.2 | 0.005 | Aluminoxane 10.0 | 20 | 55 | 46.8 | 15 |
| Example 40 | Glass beads covered with silver (30μ) | 30 | 0.005 | Aluminoxane 6.7 | 10 | 44 | 14 | 68 |

*Triethylaluminum
**Diethylaluminum chloride

EXAMPLE 41

(1) Contact Treatment of the Titanium-Containing Catalyst Component and Organic Pigment as Filler In a 500-milliliter flask the atmosphere of which had been replaced with argon were placed 100 milliliters of dehydrated n-hexane and 20 grams of phthalocyanine-green which had been vacuum dried at room temperamonochloride, and 0.005 millimole (calculated as titanium) of the same titanium-containing catalyst as prepared in (1) of Example 1 were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition produced was 41 grams. The color of the composition was dark brown. The separation of light green part from dark green part was clearly observed in the composition.

EXAMPLES 42 TO 45

Ethylene was polymerized in the same manner as in Example 41 except that the type and amount of the organic pigment, the catalyst component and the organoaluminum compound were changed as in Table 3. The results are shown in Table 3.

EXAMPLE 46

(1) Preparation of Titanium-Containing Catalyst Component

In a 200-milliliter flask the atmosphere of which had been replaced with argon were placed 50 milliliters of n-heptane and 5.4 grams (20 millimoles) of commercially available stearyl alcohol at room temperature, and then 10 millimoles of ethylbutylmagnesium was added dropwise over 20 minutes. They were heated and reacted under reflux for 3 hours. Then the reaction mixture was cooled to 40° C. and 1 millimole of titanium tetrachloride was added thereto. The mixture was then heated again and reacted under reflux for 3 hours to prepare a transparent solution.

(2) Evaluation of Activity of Titaniun-Containing Catalyst Component

Ethylene was polymerized in the same manner as in (2) of Example 1 except that 0.01 millimole (calculated as titanium) of the titanium-containing catalyst component as prepared in (1) above was used. The amount of polyethylene produced was 61.3 grams. The activity of the catalyst was 126 kilograms per gram of titanium per hour.

(3) Contact Treatment of the Titanium-Containing Catalyst Component and Organic Pigment as Filler A contact treatment product was prepared in the same manner as in (1) of Example 41 except that 12 grams of phthalocyanineblue as organic pigment and 0.01 millimole (calculated as titanium) of the titanium-containing catalyst component as prepared in (1) above were used.

(4) Polymerization of Ethylene

Ethylene was polymerized in the same manner as in (2) of Example 41 except that the contact treatment product prepared in (3) above was used. The polyethylene composition containing phthalocyanineblue was produced. The results are shown in Table 3.

EXAMPLE 47

(1) Preparation of Titanium-Containing Catalyst Component

In a 200-milliliter flask the atmosphere of which had been replaced with argon were placed 40 milliliters of dehydrated n-heptane, 4 grams (6.5 millimoles) of manganese oleate and 0.12 gram (0.65 millimole) of titanium tetrachloride at room temperature.

And then, the resulting mixture was heated and was reacted for 3 hours under reflux to prepare a titanium-containing catalyst component.

(2) Evaluation of Activity of Titanium-Containing Catalyst Component

Ethylene was polymerized in the same manner as in (2) of Example 1 except that 0.02 millimole (calculated as titanium) of the titanium-containing catalyst component as prepared in (1) above was used. The activity of the catalyst was 28 kilograms per gram of titanium per hour.

(3) Contact Treatment of the Titanium-Containing Catalyst Component and Organic Pigment as Filler In a 500-milliliter flask the atmosphere of which had been replaced with argon were placed 100 milliliters of dehydrated n-heptane, 4.0 grams of phthalocyanineblue which had been vacuum dried at room temperature (20° C.) for 4 hours and 0.02 millimole (calculated as titanium) of the titanium-containing catalyst component prepared in (1) above. Then the mixture was heated and contact-treated for 3 hours under reflux to prepare a contact treatment product.

(4) Polymerization of Ethylene

In a 1-liter autoclave were placed 300 milliliters of dehydrated n-heptane, 2.0 millimoles of triethylaluminum and 2.0 millimoles of diethylaluminum monochloride. Then the whole amount of the contact treatment product prepared in (3) above was added while stirring and the mixture was heated to 80° C.

Subsequently, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 120 minutes. The reaction condition and results are shown in Table 3.

EXAMPLE 48

(1) Contact Treatment of the Titanium-Containing Catalyst Component and Organic Pigment as Filler In a 500-milliliter flask the atmosphere of which had been replaced with argon were placed 150 milliliters of dehydrated n-hexane and 10.0 grams of quinacridone. Then 1 millimole of diethylaluminum monochloride was added dropwise while stirring and the resulting mixture was treated for an hour at 40° C.

Subsequently, 0.01 millimole of the titanium-containing catalyst component prepared in (1) of Example 1 was added thereto. The resulting mixture was treated for 2 hours at 40° C. to prepare a contact treatment product.

(2) Polymerization of Ethylene

In a 1-liter autoclave the atmosphere of which had been replaced with argon were placed the whole amount of the contact treatment product prepared in (1) above and dehydrated n-hexane so that the amount of the resulting mixture was 400 milliliters. Then, 1 millimole of triethylaluminum and 2 millimoles of diethylaluminum monochloride were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition containing quinacridone produced was 65 grams. Polyethylene was covered with quinacridone in the composition after drying. The composition was powders colored dark red uniformly.

COMPARATIVE EXAMPLE 8

In a 1-liter autoclave the atmosphere of which had been replaced with argon was placed 10 grams of quinacridone as used in the preparation of the catalyst in Example 48. Then, 400 milliliters of dehydrated n-hexane, 1 millimole of triethylaluminum, 1 millimole of diethylaluminum monochloride and 0.01 millimole (calculated as titanium) of the titanium-containing catalyst as prepared in (1) of Example 1 were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition produced was 55.0 grams. The separation of light red part from dark red part was clearly observed in the composition.

EXAMPLE 49

(1) Preparation of Titanium-Containing Catalyst Component

A transparent solution was prepared in the same manner as in (1) of Example 46 except that 20 millimoles of di-2-ethylhexyl phosphate was used in place of stearyl alcohol.

(2) Evaluation of Activity of Titanium-Containing Catalyst Component

Ethylene was polymerized in the same manner as in (2) of Example 1 except that 0.005 millimole (calculated as titanium) of the titanium-containing catalyst component as prepared in (1) above and 2 millimoles of diethylaluminum monochloride were used. The amount of polyethylene produced was 42 grams. The activity of the catalyst was 175 kilograms per gram of titanium per hour.

(3) Contact Treatment of the Titanium-Containing Catalyst Component and Organic Pigment as Filler A contact treatment product was prepared in the same manner as in (1) of Example 41 except that 5 grams of dioxazine violet as organic pigment and 0.005 millimole (calculated as titanium) of the titanium-containing catalyst component as prepared in (1) above were used.

(4) Polymerization of Ethylene

Ethylene was polymerized in the same manner as in (2) of Example 41 except that the contact treatment product prepared in (3) above and 2 millimoles of diethylaluminum monochloride were used. The results are shown in Table 3.

EXAMPLE 50

(1) Preparation of Aluminoxane

Aluminoxane was prepared in the same manner as in (1) of Example 39.

(2) Evaluation of Activity of Zirconium-Containing Catalyst Component

In a 1-liter autoclave the atmosphere of which had been replaced with argon were placed 400 milliliters of dehydrated toluene, 6 millimoles (calculated as aluminum) of the aluminoxane as prepared in (1) above, and 0.003 millimole of dicyclopentadienylzirconium dichloride, which were then heated to 50° C. Ethylene was continuously introduced while maintaining the total pressure at 8 kilograms per centimeter (by gauge) and polymerized for 5 minutes, whereupon 16.4 grams of polyethylene was produced. The activity of the catalyst was 719 kilograms per gram of zirconium per hour.

(3) Contact Treatment of the Zirconium-Containing Catalyst Component and Organic Pigment as Filler In a 500-milliliter flask the atmosphere of which had been replaced with argon were placed 100 milliliters of dehydrated toluene and 10 grams of phtalocyanine green at room temperature, and then, as a catalyst component, 0.005 millimole of dicyclopentadienylzirconium dichloride was added thereto at room temperature. They were contact-treated at room temperature for 1 hour to produce a contact treatment product.

(4) Polymerization of Ethylene

In a 1-liter autoclave the atmosphere of which had been replaced with argon were placed the whole amount of the contact treatment product prepared in (3) above and dehydrated n-hexane so that the amount of the resulting mixture was 400 milliliters. Then 10 millimoles of (calculated as aluminum) aluminoxane as organoaluminum compound was added thereto. Thereafter, in the same manner as in (2) of Example 41, ethylene was polymerized. The results are shown in Table 3.

EXAMPLE 51

(1) Preparation of Aluminoxane

Aluminoxane was prepared in the same manner as in (1) of Example 39.

(2) Evaluation of Activity of Titanium-Containing Catalyst Component

Ethylene was polymerized in the same manner as in (2) of Example 50 except that 4 millimoles (calculated as aluminum) of aluminoxane prepared in (1) above and 0.002 millimole (calculated as titanium) of the dicyclopentadienyltitanium dichloride were used, and that the polymerization period of time was 1 hour. The amount of polyethylene produced was 39.5 grams. The activity of the catalyst was 412 kilograms per gram of titanium per hour.

(3) Contact Treatment of the Titanium-Containing Catalyst Component and Organic Pigment as Filler A contact treatment product was prepared in the same manner as in (3) of Example 50 except that 12 grams of perylene maroon as organic pigment and 0.005 millimole (calculated as titanium) of the dicyclopentadienyltitanium dichloride as catalyst were used.

(4) Polymerization of Ethylene

Ethylene was polymerized in the same manner as in Example 50 except that the whole amount of the contact treatment product prepared in (3) above and 6.7 millimoles (calculated as aluminum) of aluminoxane prepared in (1) above were used. The results are shown in Table 3.

EXAMPLES 52 and 53

Ethylene was polymerized in the same manner as in Example 41 except that the type and amount of the organic pigment, the catalyst component and the organoaluminum compound were changed as in Table 3. The results are shown Table 3.

COMPARATIVE EXAMPLE 9

In a 1-liter autoclave the atmosphere of which had been replaced with argon was placed 400 milliliters of slurry containing 60 grams of the same silicon carbide powder as used in the preparation of the contact treatment product in (1) of Example 54. Subsequently, 1 millimole of triethylaluminum, 1 millimole of diethylaluminum monochloride, and 0.005 millimole (calculated

TABLE 3

| | Organic Pigment | | Amount of Catalyst calculated as Titanium or Zirconium (millimole) | TEA*1/DEAC*2 (millimole) | Time of Polymerization (min.) | Polyethylene Composition | | |
|---|---|---|---|---|---|---|---|---|
| | Type | Amount (gram) | | | | Yield (gram) | Weight of Polyethylene (gram) | Content or Organic Pigment (weight %) |
| Example 41 | Phthalocyaninegreen | 20 | 0.005 | 1/1 | 30 | 38 | 18 | 53 |
| Example 42 | " | 6.5 | 0.01 | 1/1 | 30 | 52 | 45.5 | 13 |
| Example 43 | Quinacridone | 8.5 | 0.01 | 1/1 | 40 | 61 | 52.5 | 7.2 |
| Example 44 | Isoindolinone | 6 | 0.005 | 1/1 | 45 | 38 | 32 | 16 |
| Example 45 | Helindon Red BB | 10 | 0.005 | 1/1 | 30 | 30 | 20 | 33 |
| Example 46 | Phthalocyanineblue | 12 | 0.01 | 1/1 | 30 | 38 | 26 | 32 |
| Example 47 | " | 4 | 0.02 | 2/2 | 120 | 56 | 52 | 7.1 |
| Example 48 | Quinacridone | 10 | 0.01 | 1/1 | 30 | 65 | 55 | 15 |
| Example 49 | Dioxane Violet | 5 | 0.005 | 0/2 | 30 | 20 | 15 | 25 |
| Example 50 | Phthalocyaninegreen | 10 | 0.005 | Aluminoxane 10 | 10 | 33 | 23 | 30 |
| Example 51 | Perylene Maroon | 12 | 0.005 | Aluminoxane 6.7 | 10 | 26 | 14 | 46 |
| Example 52 | " | 18 | 0.01 | 1/1 | 30 | 68 | 50 | 26 |
| Example 53 | Hansa Yellow | 20 | 0.005 | 1/1 | 20 | 35 | 15 | 57 |

*1Triethylaluminum
*2Diethylaluminum chloride

EXAMPLE 54

(1) Contact Treatment of the Titanium-Containing Catalyst Component and Ceramics as Filler In a 500-milliliter flask the atmosphere of which had been replaced with argon were placed 100 milliliters of dehydrated n-hexane and 60 grams of silicon carbide which had been vacuum dried at room temperature (20° C.) for 3 hours, and then 0.005 millimole (calculated as titanium) of the titanium-containing catalyst component prepared in (1) of Example 1 was added thereto. They were contact-treated under reflux for 1 hour to produce a contact treatment product.

(2) Polymerization of Ethylene

In a 1-liter autoclave the atmosphere of which had been replaced with argon were placed the whole amount of the contact treatment product prepared in (1) above and 300 milliliters of dehydrated n-hexane so that the amount of the resulting mixture was 400 milliliters. Then 1 millimole of triethylaluminum and 1 millimole of diethylaluminum monochloride were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition containing silicon carbide produced was 85.0 grams. After drying, the composition was powders colored gray uniformly.

The separation of silicon carbide from the polyethylene was not observed in the composition at all. The results are shown Table 4.

as titanium) of the same titanium-containing catalyst as prepared in (1) of Example 1 were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 20 minutes.

The amount of the polyethylene composition produced was 83 grams. The separation of light gray part from dark gray part was clearly observed in the composition.

EXAMPLES 55 TO 58

Ethylene was polymerized in the same manner as in Example 54 except that the type and amount of the ceramics, the catalyst component and the organoaluminum compound were changed as in Table 4. The results are shown in Table 4.

EXAMPLE 59

(1) Preparation of Titanium-Containing Catalyst Component

A transparent solution was prepared in the same manner as in (1) of Example 46.

(2) Evaluation of Activity of Titanium-Containing Catalyst Component

Ethylene was polymerized in the same manner as in (2) of Example 1 except that 0.01 millimole (calculated as titanium) of the titanium-containing catalyst component as prepared in (1) above was used. The amount of polyethylene produced was 61.3 grams. The activity of the catalyst was 126 kilograms per gram of titanium per hour.

(3) Contact Treatment of the Titanium-Containing Catalyst Component and Ceramics as Filler A contact treatment product was prepared in the same manner as in (1) of Example 54 except that 30 grams of zirconium boride powder as ceramics and 0.02 millimole (calculated as titanium) of the titanium-containing catalyst component as prepared in (1) above were used.

(4) Polymerization of Ethylene

Ethylene was polymerized in the same manner as in (2) of Example 54. The polyethylene composition containing zirconium boride was produced. The results are shown in Table 4.

EXAMPLE 60

(1) Preparation of Aluminoxane

Aluminoxane was prepared in the same manner as in (1) of Example 39.

(2) Evaluation of Activity of Zirconium-Containing Catalyst Component

In a 1-liter autoclave the atmosphere of which had been replaced with argon were placed 400 milliliters of dehydrated toluene, 6 millimoles (calculated as aluminum) of the aluminoxane as prepared in (1) above, and 0.003 millimole of dicyclopentadienylzirconium dichloride, which were then heated to 50° C. Ethylene was continuously introduced while maintaining the total pressure at 8 kilograms per centimeter (by gauge) and polymerized for 5 minutes, whereupon 16.4 grams of polyethylene was produced. The activity of the catalyst was 719 kilograms per gram of zirconium per hour.

(3) Contact Treatment of the Zirconium-Containing Catalyst Component and Ceramics as Filler In a 500-milliliter flask the atmosphere of which had been replaced with argon were placed 100 milliliters of dehydrated toluene and 100 grams of silicon carbide at room temperature, and then, as a catalyst component, 0.005 millimole of dicyclopentadienylzirconium dichloride was added thereto at room temperature. They were contact-treated at room temperature for 1 hour to produce a contact treatment product.

(4) Polymerization of Ethylene

In a 1-liter autoclave the atmosphere of which had been replaced with argon were placed the whole amount of the contact treatment product prepared in (3) above and dehydrated n-hexane so that the amount of the resulting mixture was 400 milliliters. Then 10 millimoles of (calculated as aluminum) aluminoxane as organoaluminum compound was added thereto. Thereafter, in the same manner as in (2) of Example 54, ethylene was polymerized. The results are shown in Table 4.

EXAMPLE 61

(1) Preparation of Aluminoxane

Aluminoxane was prepared in the same manner as in (1) of Example 60.

(2) Evaluation of Activity of Titanium-Containing Catalyst Component

Ethylene was polymerized in the same manner as in (2) of Example 60 above except that 4 millimoles of aluminoxane prepared in (1) above and 0.02 millimole of dicyclopentadienyl titanium dichloride were used, and that the polymerization period of time was 1 hour. The amount of polyethylene produced was 39.5 grams. The activity of the catalyst was 412 kilograms per gram of titanium per hour.

(3) Contact Treatment of the Titanium-Containing Catalyst Component and Ceramics as Filler A contact treatment product was produced in the same manner as in (3) of Example 60 except that tantalum silicide powder ($TaSi_2$) as ceramics and 0.005 millimole (calculated as titanium) of decyclopentadienyl titanium-dichloride as catalyst were used.

(4) Polymerization of Ethylene

Ethylene was polymerized in the same manner as in (4) of Example 60 except that a contact treatment product prepared in (3) above and 6.7 millimoles (calculated as aluminum) of aluminoxane prepared in (1) above were used. The results are shown in Table 4.

EXAMPLE 62 (1) Preparation of Titanium-Containing Catalyst Component

In a 200-milliliter flask the atmosphere of which had been replaced with argon were placed 40 milliliters of dehydrated n-heptane, 4 grams (6.5 millimoles) of manganese oleate and 0.12 gram (0.65 millimole) of titanium tetrachloride. And then, the resulting mixture was heated and was reacted for 3 hours under reflux to prepare a titanium-containing catalyst component.

(2) Evaluation of Activity of Titanium-Containing Catalyst Component

Ethylene was polymerized in the same manner as in (2) of Example 1 except that 0.02 millimole (calculated as titanium) of the titanium-containing catalyst component as prepared in (1) above was used. The activity of the catalyst was 28 kilograms per gram of titanium per hour.

(3) Contact Treatment of the Titanium-Containing Catalyst Component and Ceramics as Filler In a 500-milliliter flast the atmosphere of which had been replaced with argon were placed 100 milliliters of dehydrated n-heptane, 30 grams of titanium silicide ($TiSi_2$) which had been vacuum dried at room temperature (20° C.) for 4 hours and 0.02 millimole (caliculated as titanium) of the titanium-containing catalyst component prepared in (1) above. Then the resulting mixture was heated and treated for 3 hours under reflux to prepare a contact treatment product.

(4) Polymerization of Ethylene

In a 1-liter autoclave were placed 300 milliliters of dehydrated n-heptane, 2.0 millimoles of triethylaluminum and 2.0 millimoles of diethylaluminum monochloride. Then the whole amount of the contact treatment product prepared in (3) above was added while stirring and the resulting mixture was heated to 80° C. Subsequently, hydrogen gas was supplied until the hydrogen partial pressure reached 4 kilograms persquare centimeter (by gauge), and ethylene was continuously supplied while maintaining the total pressure at 9 kilograms per square centimeter (by gauge) and polymerized for 90 minutes. The reaction condition and results are shown in Table 4.

EXAMPLE 63

(1) Contact Treatment of the Titanium-Containing Catalyst Component and Ceramics as Filler In a 500-milliliter flask the atmosphere of which had been replaced with argon were placed 150 milliliters of dehydrated n-hexane and 35 grams of silicon carbide whisker(SiC), and then 1 millimole of diethylaluminum monochloride was added dropwise while stirring. They were reacted at 40° C. for 1 hour. Subsequently, 0.005 millimole (calculated as titanium) of titanium-containing catalyst component as prepared in (1) of Example 1 was added thereto and contact-treated at 40° C. for 2 hours to prepare a contact treatment product.

(2) Polymerization of Ethylene

In a 1-liter autoclave the atmosphere of which had been replaced with argon were placed the whole amount of the contact treatment product prepared in (1) above and dehydrated n-hexane so that the amount of the resulting mixture was 400 milliliters. Then 1 millimole of triethylaluminum and 1 millimole of diethylaluminum monochloride were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition produced was 63 grams. The silicon carbide whisker was entirely covered with polyethylene in the composition after drying. The separation of the silicon carbide whisker from the polyethylene was scarcely observed in the composition.

COMPARATIVE EXAMPLE 10

In a 1-liter autoclave the atmosphere of which had been replaced with argon was placed 30 grams of silicon carbide whisker as used in the preparation of the catalyst in (1) of Example 63. Then, 400 milliliters of dehydrated n-hexane, 1 millimole of triethylaluminum, 1 millimole of diethylaluminum monochloride and 0.005 millimole (calculated as titanium) of the titanium-containing catalyst as prepared in (1) of Example 1 were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition produced was 56.0 grams. The separation of silicon carbide whisker from polyethylene was clearly observed in the composition.

EXAMPLE 64

(1) Preparation of Titanium-Containing Catalyst Component

A transparent solution was prepared in the same manner as in (1) of Example 59 except that 20 millimoles of di-2-ethylhexyl phosphate was used in place of stearyl alcohol.

(2) Evaluation of Activity of Titanium-Containing Catalyst Component

Ethylene was polymerized in the same manner as in (2) of Example 1 except that 0.005 millimole (calculated as titanium) of the titanium-containing catalyst component as prepared in (1) above and 2 millimoles of diethylaluminum monochloride were used. The amount of polyethylene produced was 42 grams. The activity of the catalyst was 175 kilograms per gram of titanium per hour.

(3) Contact Treatment of the Titanium-Containing Catalyst Component and Ceramics as Filler A contact treatment product was prepared in the same manner as in (1) of Example 54 except that boron nitride powder as ceramics and 0.01 millimole (calculated as titanium) of the titanium-containing catalyst component as prepared in (1) above were used.

(4) Polymerization of Ethylene

Ethylene was polymerized in the same manner as in (2) of Example 54 except that the contact treatment product prepared in (3) above and 2 millimoles of diethylaluminum monochloride were used. The results are shown in Table 4.

TABLE 4

| | Ceramics | | Amount of Catalyst calculated as Titanium or Zirconium (millimole) | TEA*1/DEAC*2 (millimole) | Time of Polymerization (min.) | Polyethylene Composition | | |
|---|---|---|---|---|---|---|---|---|
| | Type | Amount (gram) | | | | Yield (gram) | Weight of Polyethylene (gram) | Content or Ceramics (weight %) |
| Example 54 | SiC powder (0.3μ) | 60 | 0.005 | 1/1 | 30 | 85 | 25 | 71 |
| Example 55 | SiC whisker (0.5 × 100μ) | 25 | 0.005 | 1/1 | 40 | 49 | 24 | 51 |
| Example 56 | Cr$_3$C$_2$ powder (5μ) | 30 | 0.005 | 1/1 | 10 | 45 | 15 | 67 |
| Example 57 | Si$_3$N$_4$ powder (0.7μ) | 80 | 0.01 | 1/1 | 20 | 110 | 30 | 73 |
| Example 58 | TiB$_2$ powder (5μ) | 100 | 0.005 | 1/1 | 25 | 110 | 10 | 91 |
| Example 59 | ZrB$_2$ powder (0.7μ) | 30 | 0.02 | 2/2 | 40 | 80.5 | 50.5 | 37 |
| Example 60 | SiC powder (0.3μ) | 100 | 0.005 | Aluminoxane 10 | 10 | 128 | 28 | 78 |
| Example 61 | TaSi$_2$ powder (0.4μ) | 20 | 0.005 | Aluminoxane 6.7 | 10 | 31 | 11 | 65 |
| Example 62 | TiSi$_2$ powder (0.7μ) | 30 | 0.02 | 2/2 | 90 | 75 | 45 | 40 |
| Example 63 | SiC whisker (0.5 × 100μ) | 35 | 0.005 | 1/1 | 30 | 63 | 28 | 56 |
| Example 64 | BN powder (5μ) | 35 | 0.01 | 0/2 | 30 | 58 | 23 | 60 |

*1Triethylaluminum
*2Diethylaluminum chloride

EXAMPLE 65

(1) Contact Treatment of the Titanium-Containing Catalyst Component and Forming Agent as Filler In a 500-milliliter flask the atmosphere of which had been replaced with argon were placed 100 milliliters of dehydrated n-hexane, 3.3 grams of azodicarbonamide (ADCA) which had been vacuum dried at room temperature (20° C.) for 3 hours and 0.005 millimole (calculated as titanium) of the titanium-containing catalyst component prepared in (1) of Example 1. Then the mixture was heated and contact-treated for 3 hour under reflux to prepare a contact treatment product.

(2) Polymerization of Ethylene

In a 1-liter autoclave the atmosphere of which had been replaced with argon were placed the whole amount of the contact treatment product prepared in (1) above and 300 milliliters of dehydrated n-hexane so that the amount of the resulting mixture was 400 milliliters. Then 1 millimole of triethylaluminum and 1 millimole of diethylaluminum monochloride were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 35 minutes.

The amount of the polyethylene composition produced was 27 grams. After drying, the polyethylene composition containing azodicarbonamide was light yellow. The separation of the azodicarbonamide from the polyethylene was scarcely observed in the composition.

The polyethylene composition obtained above was subjected to heat treatment to produce the uniformly foaming material.

The polymerization condition and results are shown in Table 5.

COMPARATIVE EXAMPLE 11

In a 1-liter autoclave the atmosphere of which had been replaced with argon was placed 400 milliliters of slurry containing 4 grams of the same azodicarbonamide as used in the preparation of the contact treatment product in (1) of Example 65. Subsequently, 1 millimole of triethylaluminum, 1 millimole of diethylaluminum monochloride, and 0.005 millimole (calculated as titanium) of the same titanium-containing catalyst as prepared in (1) of Example 1 were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes.

The amount of the polyethylene composition produced was 25 grams. The color of the composition was light yellow. The separation of azodicarbonamide from polyethylene was clearly observed in the composition.

EXAMPLES 66 TO 68

Ethylene was polymerized in the same manner as in Example 65 except that the type and amount of the forming agents, the catalyst component and the organoaluminum compound were changed as in Table 5. The results are shown in Table 5.

EXAMPLE 69

(1) Preparation of Titanium-Containing Catalyst Component

A transparent solution was prepared in the same manner as in (1) of Example 46.

(2) Evaluation of Activity of Titanium-Containing Catalyst Component

Ethylene was polymerized in the same manner as in (2) of Example 1 except that 0.01 millimole (calculated as titanium) of the titanium-containing catalyst component as prepared in (1) above was used. The amount of polyethylene produced was 61.3 grams. The activity of the catalyst was 126 kilograms per gram of titanium per hour.

(3) Contact Treatment of the Titaniun-Containing Catalyst Component and Forming Agent as Filler A contact treatment product was prepared in the same manner as in (1) of Example 65 except that 5.0 grams of p,p'-oxybis(benzenesulfonylhydrazide) and 0.01 millimole (calculated as titanium) of the titanium-containing catalyst component as prepared in (1) above were used.

(4) Polymerization of Ethylene

Ethylene was polymerized in the same manner as in (2) of Example 65. The polyethylene composition containing p,p'-oxybis(benzenesulfonylhydrazide) was prepared. The results are shown in Table 5.

EXAMPLE 70

(1) Contact Treatment of the Titanium-Containing Catalyst Component and Forming Agent as Filler In a 500-milliliter flask the atmosphere of which had been replaced with argon were placed 150 milliliters of dehydrated n-hexane and 10 grams of azodicarbonamide, and then 1 millimole of diethylaluminum monochloride was added dropwise while stirring. They were reacted at 40° C. for 1 hour. Subsequently, 0.005 millimole (calculated as titanium) of titanium-containing catalyst component as prepared in (1) of Example 1 was added thereto and contact-treated at 40° C. for 2 hours to prepare a contact treatment product.

(2) Polymerization of Ethylene

In a 1-liter autoclave the atmosphere of which had been replaced with argon were placed the whole amount of the contact treatment product prepared in (1) above and dehydrated n-hexane so that the amount of the resulting mixture was 400 milliliters. Then 1 millimole of triethylaluminum and 1 millimole of diethylaluminum monochloride were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 20 minutes.

The amount of the polyethylene composition produced was 41 grams. After drying, the color of the composition was light yellow. The separation of the azodicarbonamide from the polyethylene was scarcely observed in the composition.

EXAMPLE 71

(1) Preparation of Titanium-Containing Catalyst Component

A transparent solution was prepared in the same manner as in (1) of Example 70 except that 20 millimoles of di-2-ethylhexyl phosphate was used in place of stearyl alcohol.

(2) Evaluation of Activity of Titanium-Containing Catalyst Component

Ethylene was polymerized in the same manner as in (2) of Example 1 except that 0.005 millimole (calculated as titanium) of the titanium-containing catalyst component as prepared in (1) above and 2 millimoles of diethylaluminum monochloride were used. The amount of polyethylene produced was 42 grams. The activity of the catalyst was 175 kilograms per gram of titanium per hour.

(3) Contact Treatment of the Titanium-Containing Catalyst Component and Forming Agent as Filler A contact treatment product was prepared in the same manner as in (1) of Example 65 except that N,N'-dinitrosopentamethylenetetraamine (DPT) as forming agent and 0.01 millimole (calculated as titanium) of the titanium-containing catalyst component as prepared in (1) above were used.

(4) Polymerization of Ethylene

Ethylene was polymerized in the same manner as in (2) of Example 65 except that the contact treatment product prepared in (3) above and 2 millimoles of diethylaluminum monochloride were used. After drying, the color of the composition produced was light yellow.

The separation of the N,N'-dinitrosopentamethylenetetraamine from the polyethylene was scarcely observed in the composition. The results are shown in Table 5.

COMPARATIVE EXAMPLE 12

In a 1-liter autoclave the atmosphere of which had been replaced with argon was placed 10 grams of the same N,N'-dinitrosopentamethylenetetraamine as used in the preparation of the catalyst prepared in Example 71.

Then, 400 milliliters of dehydrated n-hexane, 2 millimoles of diethyl aluminum monochloride and 0.01 millimole (calculated as titanium) of the titanium-containing catalyst as prepared in (1) of Example 71 were added thereto, and the resulting mixture was heated to 80° C. Then, hydrogen gas was supplied until the hydrogen partial pressure reached 4 kilograms per square centimeter (by gauge), and ethylene was continuously supplied while maintaining the total pressure at 9 kilograms per square centimeter (by gauge) and polymerized for 30 minutes. The amount of the polyethylene composition produced was 48.0 grams. The color of the composition was light yellow. The separation of N,N'-dinitrosopentamethylenetetraamine from the polyethylene was clearly observed in the composition.

EXAMPLE 72

(1) Preparation of Aluminoxane

Aluminoxane was prepared in the same manner as in (1) of Example 39.

(2) Evaluation of Activity of Zirconium-Containing Catalyst Component

In a 1-liter autoclave the atmosphere of which had been replaced with argon were placed 400 milliliters of dehydrated toluene, 6 millimoles (calculated as aluminum) of the aluminoxane as prepared in (1) above, and 0.003 millimole of dicyclopentadienylzirconium dichloride, which were then heated to 50° C. Ethylene was continuously introduced while maintaining the total pressure at 8 kilograms per centimeter (by gauge) and polymerized for 5 minutes, whereupon 16.4 grams of polyethylene was produced. The activity of the catalyst was 719 kilograms per gram of zirconium per hour.

(3) Contact Treatment of the Zirconium-Containing Catalyst Component and Forming Agent as Filler In a 500-milliliter flask the atmosphere of which had been replaced with argon were placed 100 milliliters of dehydrated toluene and 15 grams of dried p-toluenesulfonylhydrazide(TSH) at room temperature, and then, as a catalyst component, 0.005 millimole (calculated as zirconium) of dicyclopentadienylzirconium dichloride was added thereto at room temperature. They were contact-treated at room temperature for 1 hour to produce a contact treatment product.

(4) Polymerization of Ethylene

In a 1-liter autoclave the atmosphere of which had been replaced with argon were placed the whole amount of the contact treatment product prepared in (3) above and dehydrated n-hexane so that the amount of the resulting mixture was 400 milliliters. Then 10 millimoles (calculated as aluminum) of aluminoxane prepared in (1) above as organoaluminum compound was added thereto. Thereafter, in the same manner as in (2) of Example 65 ethylene was polymerized. The results are shown in Table 5.

EXAMPLE 73

(1) Preparation of Aluminoxane

Aluminoxane was prepared in the same manner as in (1) of Example 39.

(2) Evaluation of Activity of Titanium-Containing Catalyst Component

Ethylene was polymerized in the same manner as in (2) of Example 72 except that 4 millimoles (calculated as aluminum) of the aluminoxane as prepared in (1) above and 0.002 millimole of dicyclopentadienyltitanium dichloride were used, and polymerized for 1 hour. Then 39.5 grams of polyethylene was produced. The activity of the catalyst was 412 kilograms per gram of titanium per hour.

(3) Contact Treatment of the Titanium-Containing Catalyst Component and Forming Agent as Filler A contact treatment product was prepared in the same manner as in (3) of Example 72 except that 20 grams of azodicarbonamide as forming agent and 0.005 millimole (calculated as titanium) of dicyclopentadienyltitanium dichloride as the titanium-containing catalyst component were used.

(4) Polymerization of Ethylene

Ethylene was polymerized in the same manner as in Example 72 except that the contact treatment product prepared in (3) above and 7.5 millimoles of aluminoxane as prepared in (1) above were used. The results are shown in Table 5.

TABLE 5

| | Forming Agent | | Amount of Catalyst Calculated as Titanium or Zirconium (millimole) | TEA*1/ DEAC*2 (millimole) | Time of Polymerization (min.) | Polyethylene Composition | | |
|---|---|---|---|---|---|---|---|---|
| | Type | Amount (gram) | | | | Yield (gram) | Weight of Polyethylene (gram) | Content of Forming Agent (weight %) |
| Example 65 | Azodicarbonamide | 3.3 | 0.005 | 1/1 | 35 | 27 | 23.7 | 12 |
| Example 66 | " | 10 | 0.01 | 1/1 | 30 | 42 | 32 | 24 |
| Example 67 | Azobisisobutyronitrile | 5 | 0.01 | 1/1 | 20 | 30 | 25 | 17 |
| Example 68 | p-Toluenesulfonylhydrazide | 3 | 0.005 | 1/1 | 30 | 24 | 21 | 13 |
| Example 69 | p,p'-Oxybis(benzenesulfonyl hydrazide) | 5 | 0.01 | 1/1 | 45 | 33 | 28 | 15 |
| Example 70 | Azodicarbonamide | 10 | 0.01 | 1/1 | 20 | 41 | 31 | 24 |
| Example 71 | N,N'—Dinitrosopenthamethylene tetraamine | 12 | 0.01 | 0/2 | 30 | 47 | 35 | 26 |
| Example 72 | p-Toluenesulfonylhydrazide | 15 | 0.005 | Aluminoxane 10 | 10 | 35 | 20 | 29 |
| Example 73 | Azodicarbonamide | 20 | 0.005 | Aluminoxane 7.5 | 10 | 33 | 13 | 61 |

*1 Triethylaluminum
*2 Diethylaluminum chloride

What is claimed is:

1. A low pressure process for producing a polyethylene composition which comprises polymerizing (i) ethylene or (ii) compolymerizing ethylene and a small amount of other α-olefins at low pressure to produce said polyethylene composition in the presence of an amount of a catalyst comprising:
   (A) a product resulting from contact treatment of
      (a) a high activity catalyst component containing a transition metal and soluble in a hydrocarbon solvent, and
      (b) a filler; and
   (B) an organoaluminum compound; wherein the component (a) has sufficient activity so that at least 10 kilograms of polyethylene per gram of the transition metal atom per unit ethylene partial pressure is produced in a low-pressure polymerization of ethylene in the presence of the component (a) and the component (B), sufficiently small so that deashing of said polyethylene composition to remove catalyst is not required.

2. The process as claimed in claim 1, wherein the component (a) is a reaction product of (A) a higher fatty acid salt, (B) higher alcohol salt or (C) a compound which contains a long chain hydrocarbon group and a phosphoric acid with a magnesium or manganese salt and a titanium compound represented by the general formula: $TiX_n(OR)_{4-n}$, wherein R is an alkyl group having from 1 to 10 carbon atoms, or an acyl group, X is a halogen atom, and n is a real number of 0 to 4, the molar ratio of the titanium compound to the salt being 0.5 or less: 1.

3. The process as claimed in claim 1, wherein the component (a) is a cyclopentadienyl compound represented by the general formula: $(cp)MR^1R^2R^3$ wherein cp is a cyclopentadienyl group, M is titanium, vanadium, zirconium or hafnium, and $R^1$, $R^2$ and $R^3$ are each an alkyl group having from 1 to 6 carbon atoms, a cyclopentadienyl group, a halogen atom, or a hydrogen atom; and said organoaluminum compound (B) is aluminoxane.

4. The process as claimed in claim 1, wherein the component (a) is a cyclopentadienyl compound represented by the general formula: $(cp)_2MR^1R^2$ wherein cp is a cyclopentadienyl group, M is titanium, vanadium, zirconium or hafnium, and $R^1$ and $R^2$ are each an alkyl group having from 1 to 6 carbon atoms, a cyclopentadienyl group, a halogen atom, or a hydrogen atom; and said organoaluminum compound (B) is aluminoxane.

5. The process as claimed in claim 1, wherein the component (a) is a cyclopentadienyltitanium compound and said organoaluminum compound (B) is aluminoxane.

6. The process as claimed in claim 1, wherein the component (a) is a cyclopentadienylzirconium compound and said organoaluminum compound (B) is aluminoxane.

7. The process as claimed in claim 5, wherein the filler of the component (b) is brought into contact treatment with said aluminoxane prior to the contact treatment of the component (a) and the filler of the component (b).

8. The process as claimed in claim 1, wherein the transition metal contained in the component (a) is titanium or zirconium.

9. The process as claimed in claim 1, wherein the filler of the component (b) is one or more of metals, metal oxides, metal carbonates, and carbonaceous substances.

10. The process as claimed in claim 1, wherein the filler of the component (b) is a filler plated with a metal or covered with a metal or metal oxide.

11. The process as claimed in claim 1, wherein the filler of the component (b) is an organic pigment insoluble in hydrocarbon solvents.

12. The process as claimed in claim 1, wherein the filler of the component (b) is a fibrous, whisker-like or powdered ceramic.

13. The process as claimed in claim 1, wherein the filler of the component (b) is a solid foaming agent insoluble in hydrocarbon solvents.

14. The process as claimed in claim 1, wherein the filler of the component (b) has a maximum length of 5 millimeters or less.

15. The process as claimed in claim 1, wherein the proportion of the filler of the component (b) in the polyethylene composition is at least 0.5 percent by weight.

16. The process as claimed in claim 1, wherein the filler of the component (b) is brought into contact treatment with an organoaluminum compound prior to the contact treatment of the component (a) and the filler of the component (b).

17. A low pressure process for producing a polyethylene composition which comprises polymerizing (i) ethylene or (ii) copolymerizing ethylene and a small amount of other α-olefins at low pressure to produce said polyethylene composition in the presence of an amount of a catalyst comprising:
 (A) a product resulting from contact treatment of
  (a) a high activity catalyst component containing a transition metal and soluble in a hydrocarbon solvent, and
  (b) a filler;
 (B) an organoaluminum compound; and
 (C) a filler exhibiting an affinity for polyethylene, equivalent to or more than that of the filler of the component (b);
wherein the component (a) has sufficient activity so that at least 10 kilograms of polyethylene per gram of the transition metal atom per unit ethylene partial pressure is produced in a low-pressure polymerization of ethylene in the presence of the component (a) and the component (B), sufficiently small so that deashing of said polyethylene composition to remove catalyst is not required.

18. The process as claimed in claim 17, wherein the filler of the component (b) is one or more of metals, metal oxides, metal carbonates, and carbonaceous substances.

19. The process as claimed in claim 17, wherein the filler of the component (C) is one or more of metals, metal oxides, metal carbonates, and carbonaceous substances.

20. The process as claimed in claim 5, wherein the filler of the component (b) is one or more of metals, metal oxides, metal carbonates, and carbonaceous substances.

21. The process as claimed in claim 5, wherein the filler of the component (b) is a filler plated with a metal or covered with a metal or metal oxide.

22. The process as claimed in claim 5, wherein the filler of the component (b) is an organic pigment insoluble in hydrocarbon solvents.

23. The process as claimed in claim 5, wherein the filler of the component (b) is a fibrous, whisker-like or powdered ceramic.

24. The process as claimed in claim 5, wherein the filler of the component (b) is a solid foaming agent insoluble in hydrocarbon solvents.

25. The process as claimed in claim 5, wherein the filler of the component (b) has a maximum length of 5 millimeters or less.

26. The process as claimed in claim 5, wherein the proportion of the filler of the component (b) in the polyethylene composition is at least 0.5 percent by weight.

* * * * *